US008335705B2

(12) United States Patent
Ehrler et al.

(10) Patent No.: US 8,335,705 B2
(45) Date of Patent: Dec. 18, 2012

(54) MANAGING RESOURCES FOR PROJECTS

(75) Inventors: Stefan Ehrler, Biblis (DE); Matthias Fell, Wiesloch (DE); Torsten Lang, Biblis (DE); Ralf Wiedemann, Schwetzingen (DE)

(73) Assignee: SAP AG, Walldorf (DE)

(*) Notice: Subject to any disclaimer, the term of this patent is extended or adjusted under 35 U.S.C. 154(b) by 1975 days.

(21) Appl. No.: 10/611,311

(22) Filed: Jul. 1, 2003

(65) Prior Publication Data

US 2005/0004825 A1 Jan. 6, 2005

(51) Int. Cl.
*G06Q 10/00* (2012.01)
(52) U.S. Cl. ...... 705/7.15; 705/7.14; 718/104; 718/103; 379/88.19; 379/201.05
(58) Field of Classification Search .................. None
See application file for complete search history.

(56) References Cited

U.S. PATENT DOCUMENTS

| 5,943,652 | A | * | 8/1999 | Sisley et al. ............... 705/7.25 |
|---|---|---|---|---|
| 6,088,678 | A | * | 7/2000 | Shannon .................. 705/7.23 |
| 6,101,480 | A | * | 8/2000 | Conmy et al. ............. 705/7.18 |
| 6,275,812 | B1 | * | 8/2001 | Haq et al. ................. 705/7.14 |
| 6,985,872 | B2 | * | 1/2006 | Benbassat et al. ......... 705/7.14 |
| 7,155,399 | B2 | * | 12/2006 | Andre et al. .............. 705/7.14 |
| 7,155,400 | B1 | * | 12/2006 | Jilk et al. ................. 705/7.14 |
| 7,437,304 | B2 | * | 10/2008 | Barnard et al. ............ 705/7.15 |
| 2002/0002478 | A1 | * | 1/2002 | Swart et al. .................. 705/8 |
| 2002/0007289 | A1 | * | 1/2002 | Malin et al. .................. 705/4 |
| 2002/0022982 | A1 | * | 2/2002 | Cooperstone et al. .......... 705/7 |
| 2002/0029161 | A1 | * | 3/2002 | Brodersen et al. ............ 705/9 |
| 2002/0040313 | A1 | * | 4/2002 | Hunter et al. ................ 705/9 |
| 2002/0069235 | A1 | * | 6/2002 | Chen ....................... 709/104 |
| 2002/0103731 | A1 | * | 8/2002 | Barnard et al. ............. 705/34 |
| 2002/0131565 | A1 | * | 9/2002 | Scheuring et al. ......... 379/88.19 |
| 2002/0156674 | A1 | * | 10/2002 | Okamoto et al. ............ 705/11 |
| 2003/0033184 | A1 | * | 2/2003 | Benbassat et al. ............ 705/8 |
| 2003/0033187 | A1 | * | 2/2003 | Jones et al. ................. 705/9 |
| 2003/0061261 | A1 | * | 3/2003 | Greene ................... 709/104 |
| 2003/0110070 | A1 | * | 6/2003 | De Goeij ................... 705/8 |
| 2003/0139955 | A1 | * | 7/2003 | Kirii et al. .................. 705/7 |
| 2004/0039619 | A1 | * | 2/2004 | Zarb ........................ 705/7 |
| 2004/0117046 | A1 | * | 6/2004 | Colle et al. ................ 700/99 |
| 2005/0049911 | A1 | * | 3/2005 | Engelking et al. .......... 705/11 |
| 2006/0080119 | A1 | * | 4/2006 | Hegmann et al. ............ 705/1 |

OTHER PUBLICATIONS

Noah Gans, & Yong-Pin Zhou. (2002). Managing learning and turnover in employee staffing. Operations Research, 50(6), 991-1006.*

(Continued)

*Primary Examiner* — Gurkanwaljit Singh
(74) *Attorney, Agent, or Firm* — Finnegan, Henderson, Farabow, Garrett & Dunner, LLP

(57) ABSTRACT

Project management is made easier and more effective by enabling a planner to define project roles for tasks of a project and then, separately search for actual resources that match the project roles.

14 Claims, 28 Drawing Sheets

OTHER PUBLICATIONS

Tom Stein. (Jun. 2003). Inside out. Optimize,91-93.*
Stephen E Mueller. (2000). Resolving work breakdown structure problems. AACE International Transactions,PS2.1-PS2.4.*
Robert G Cooper, & Scott J Edgett. (2003). Overcoming the crunch in resources for new product development. Research Technology Management, 46(3), 48-58.*
Gould, Brian D. (2003). Relational project modeling and risk projection framework. M.S.C.S. dissertation, West Virginia University, United States—West Virginia.*

Robert J DeFillippi. (2002). Organizational models for collaboration in the new economy. HR. Human Resource Planning, 25(4), 7-18.*
Robert C Preziosi. (Apr. 1986). Productivity Management Competencies: Differences in Managerial and Organizational Assessments: A survey suggests that managers often believe their organizations underestimate the importance of productivity management competencies.. National Productivity Review (1986-1998), 5(2), 174.*

* cited by examiner

FIG. 8

| Project: PRP | Start | End | Overhead |
|---|---|---|---|
| • Phase 1 | | | |
|     o Task 1 | | | |
|         ▪ Role: Project Leader | | | |
|             • GP: Hans Meier | | | |
|     o Task 2 | | | |
|         ▪ Role: HR-Consultant | | | |
|             • GP: Fritz Müller | | | |
|     o Task 3 | | | |
| • Phase 2 | | | |
|     o Task 4 | | | |
|         ▪ Role: FI-Consultant | | | |
|     o Task 5 | | | |
|         ▪ Role: HR-Consultant | | | |
| • Role: Project Leader | | | |
|     o GP: Hans Meier | | | |
|     o Task 1 | | | |
| • Role: HR-Consultant | | | |
|     o GP: Fritz Müller | | | |
|     o Task 2 | | | |
|     o Task 5 | | | |
| • Role: FI-Consultant | | | |
|     o Task 4 | | | |
| • GP: Hans Meier | | | |
|     o Role: Project Leader | | | |
|         ▪ Task 1 | | | |
| • GP: Fritz Müller | | | |
|     o Role: HR-Consultant | | | |
|         ▪ Task 2 | | | |
|         ▪ Task 5 | | | |

FIG. 15

| PRP 2.0 | WFM Core | Groupware |
|---|---|---|
| Project Role | Demand | No |
| Business Partner | Resource | Groupware-Participant |
| Resource Allocation: Allocation Between Project Role and Business Partner | "Sub-Demand" - Refinement of the Demand for Project Role | Groupware-Task (Sub-Demand GUID is Present in the Category) |
| Appointments of the Business Partner | Assignment Between Resource and Sub-Demand | Groupware-Appointment (Sub-Demand GUID is Present in the Category) |
| Task | No | No |

| PRP 3.0 | WFM Core | Groupware |
|---|---|---|
| Project Role | Demand | No |
| Business Partner | Resource | Groupware-Participant |
| Resource Allocation: Allocation Between Project Role and Business Partner | Capacitive Assignment Between Demand and Resource | Groupware-Task (Assignment GUID of the Capacitive Assignment Belongs in the Category) |
| Appointments of the Business Partner | Refined Assignment (Parent = Capacitive Assignment) Between Resource and Demand | Groupware-Appointment (Parent-Assignment GUID of the Capacitive Assignments Belongs in the Category) |
| Task | No | No |

FIG. 29

MANAGING RESOURCES FOR PROJECTS

This description relates to managing resources for projects.

BACKGROUND

In executing projects, a company or other organization or enterprise must manage, for example, available human resources. Project management software, such as Microsoft Project, can aid a manager of a company in defining a project and the tasks to be done. The manager must also identify and engage human resources needed to complete the defined tasks. Individuals in an enterprise often maintain calendars, task lists, and electronic communications using programs like Microsoft Outlook and Lotus Notes.

SUMMARY

In general, in one aspect, the invention features a machine-based method that includes (a) searching a database for information about resources that may be used for participation in projects, the database containing time periods during which each of the resources is available and amounts of participation for which the resources can be used for the projects, (b) the searching comprising matching proposed amounts of participation and proposed time periods with the time periods and amounts of participation stored in the database, and (c) identifying resources based on the matching.

Implementations of the invention may include one or more of the following features. The resources include people. The time periods during which each of the resources is available comprise availability. The amounts of participation for which the resources can be used comprise utilization. The database also contains information about qualifications of the resources for participation in the projects, and the searching also comprises matching proposed qualifications with qualifications stored in the database. The planner selects resources to be used for the projects, the selection being made from among the resources identified on the basis of the matching. Communications are made with resources about the selection using a groupware program.

In general, in another aspect, the invention features a machine-based method that includes enabling a project planner to identify a person to participate in a project that has time constraints on its completion, and in response to the identifying of the person, scheduling assignments for the person that are consistent with the time constraints of the project, the assignments being selectively either tentative assignments or committed assignments.

Implementations of the invention may include one or more of the following features. The scheduled assignments comprise assignments of specific time periods. Scheduled assignments are searched to identify people available for assignment, the searching being arranged to treat people as unavailable at times when they are subject to scheduled fixed assignments. The searching is also arranged to treat people as unavailable at times when they are subject to scheduled tentative assignments. Scheduled assignments for a person may exceed 100% of the working time of the person. The scheduled assignments may exceed 100% of the working time of the person.

In general, in another aspect, the invention features a machine-based method that includes (a) maintaining a database of information about human resources of an enterprise including assignments of human resources to roles in projects being conducted by the enterprise, the database being managed by a workforce management application, and (b) when assignments of human resources to roles in projects are made or changed in a project resource planning application that is distinct from the workforce management application, updating the human resources database to incorporate the information about the assignments.

Implementations of the invention may include one or more of the following features. The assignments comprise utilization and availability information with respect to the human resources of the enterprise. Requests are received from users through the project resource planning application for information about availability and utilization of human resources, and based on the requests, the human resources database is automatically queried. Information is made available, online to users within the enterprise, about tasks of projects for which human resources have not been scheduled, and requests are received to schedule the users for the tasks.

In general, in another aspect, the invention features a machine-based method that includes (a) maintaining a common database of information about availability of resources of an enterprise for participation on projects of the enterprise, (b) enabling project planners to search the database for resources for possible assignment to projects and to assign resources to projects, (c) providing information about resources assigned to the projects from the common database to a groupware application to enable the groupware application to schedule the resources and alert the resources of the scheduling, (d) providing updated information about scheduling of the resources from the groupware back to the common database, and updating the common database based on the updated information.

Implementations of the invention may include one or more of the following features. Enabling project planners to search the database includes receiving requests from the project planners at an interface of a project resource planning application, and providing the requests to the common database of information. The groupware application comprises Microsoft Outlook or Lotus Notes. The assignments to projects are expressed as calendar tasks in the groupware application. The resources comprise human resources. The updated information about scheduling is entered by a user of the groupware application.

In general, in another aspect, the invention features a machine-based method that includes maintaining information about a project of an enterprise, the information including assignments of human resources to roles associated with the project, and providing online reports of all roles and assignments of human resources to all roles for the project.

Implementations of the invention may include one or more of the following features. Information is accumulated about assignments of human resources to roles associated with multiple projects, and a user is enabled to obtain online analyses of utilization and availability of human resources across the multiple projects.

In general, in another aspect, the invention features a machine-based method that includes receiving from a project planner, with respect to a project, identifications of project roles to be performed for a project, the project roles identifying attributes of human resources useful for performing at least a portion of the project, without limiting the identification to specific human resources.

Implementations of the invention may include one or more of the following features. The attributes comprise qualifying attributes that define qualifications of suitable human resources. The attributes comprise capacitive attributes that define time constraints on suitable human resources. The attributes for the project roles are defined by the project planner in connection with planning the project. The project roles are defined as generic project roles and the project planner selects the project roles for the project from the generic project roles. Tasks of the project are associated with respective ones of the identified project roles. The project planner is enabled to identify specific human resources for at least some of the project roles in a manner that is independent of the identification of the project roles or the associating of tasks with roles.

In general, in another aspect, the invention features a machine-based method that includes presenting to a project planner a list of project roles needed for completing a project of an enterprise, and enabling the project planner to assign tasks of the project to respective ones of the project roles without necessarily having specific human resources identified for each of the project roles.

In general, in another aspect, the invention features a machine-based method that includes enabling a project manager to search a database for specific human resources that match defined attributes of project roles associated with a project of an enterprise.

Implementations of the invention may include one or more of the following features. The attributes comprise qualifying attributes that define qualifications of suitable human resources. The attributes comprise capacitive attributes that define time constraints on suitable human resources. The capacitive attributes include availability or utilization. The project manager is enabled to identify the importance of respective attributes. The importance can be identified as mandatory or optional for qualification requirements.

Other features and advantages of the invention will be apparent from the description and from the claims.

DESCRIPTION OF DRAWINGS

FIGS. 6 through 8, 16 through 28, and 30 are screen shots of a user interface.
FIGS. 15 and 29 are tables.

DETAILED DESCRIPTION

Figure 1:
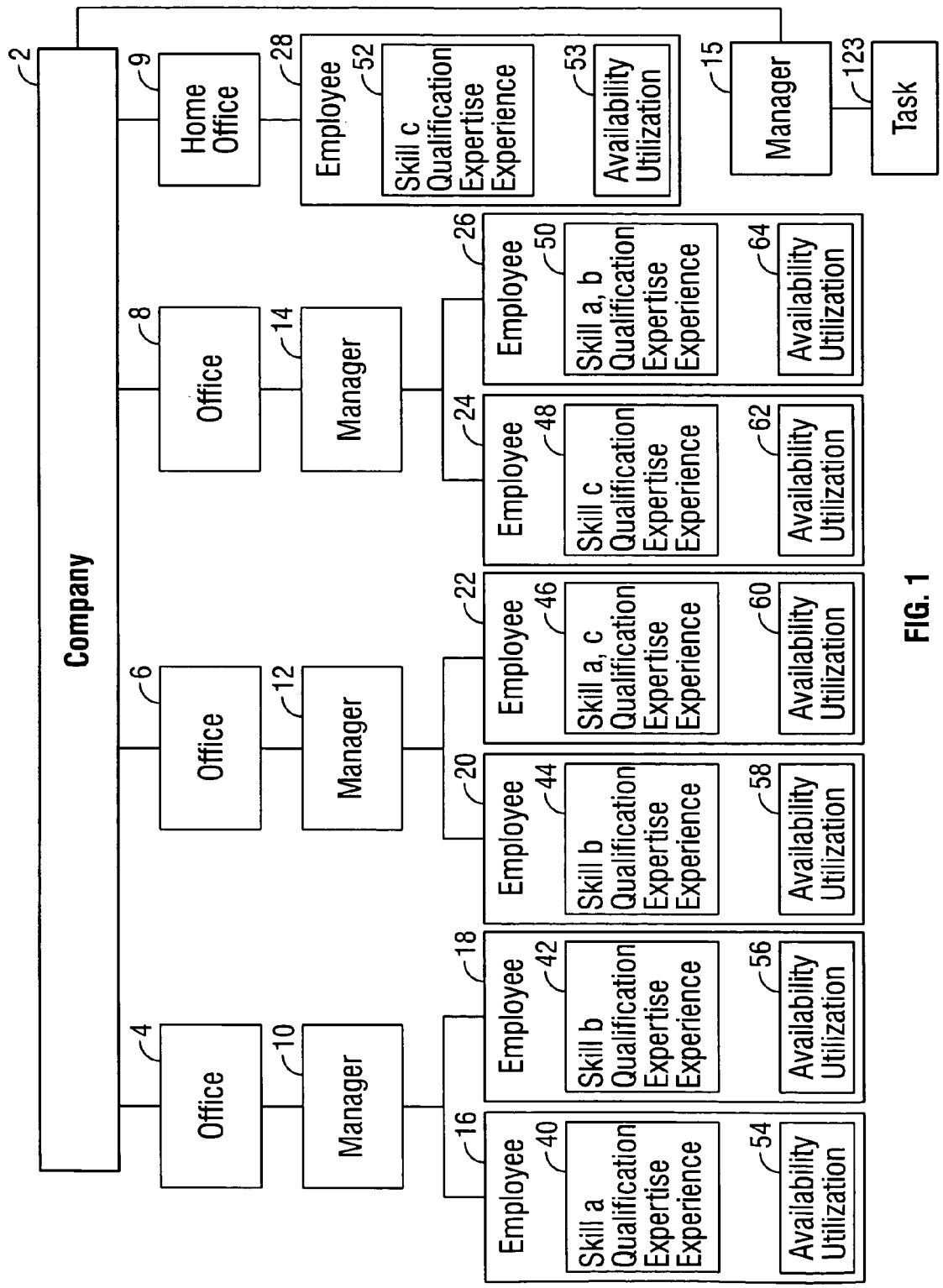
FIGS. 1 through 5 and 9 through 13 are block diagrams.
Figure 11:
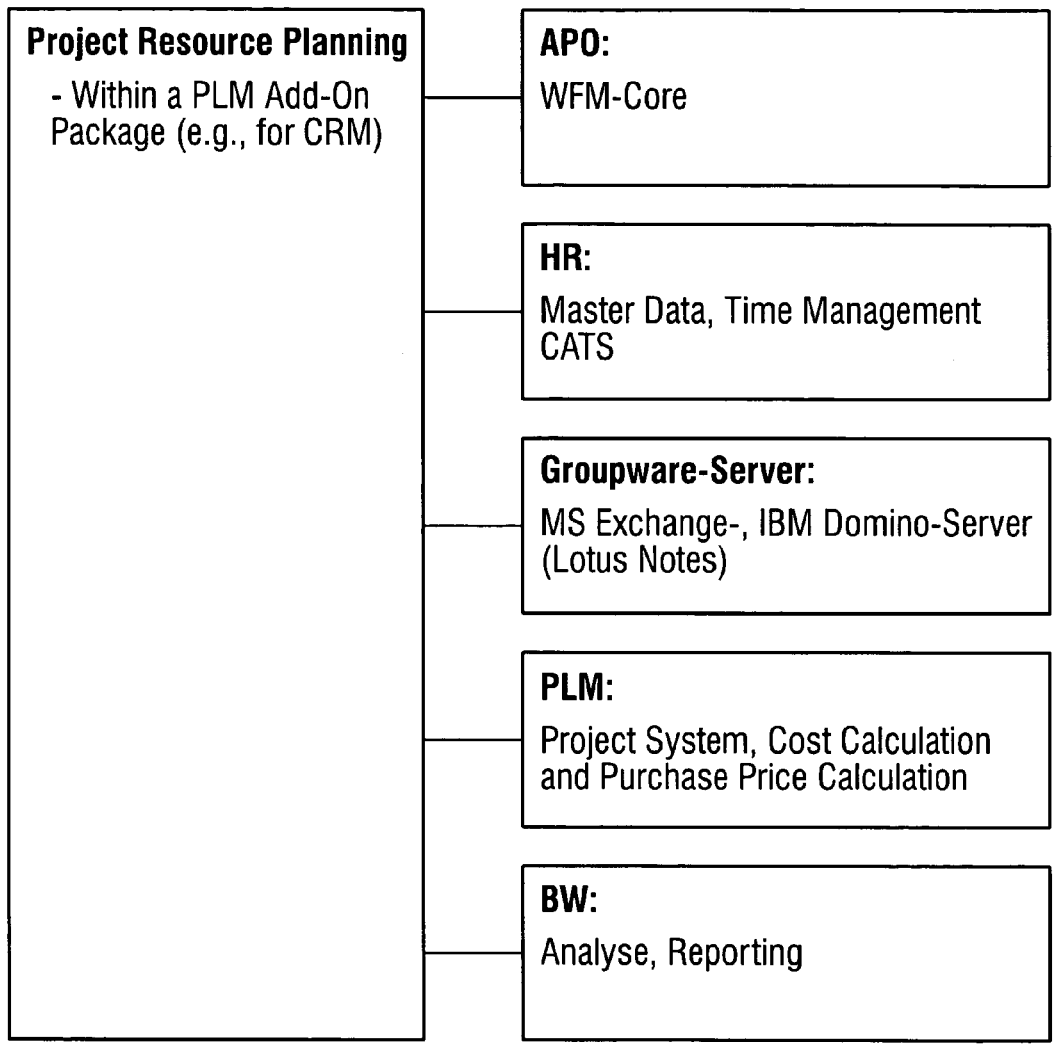

A typical large, geographically dispersed company 2 (FIG. 1; see also FIG. 11) has many employees (and consultants and agents) 16 through 28 who have a variety of skills and qualifications, along with different levels of experience and areas of expertise 40 through 52. The term "employees" includes any human resource that may be capable of and available to work on projects, whether an employee, a consultant, an agent, or a person having some other legal relationship with a company. By a company, we mean to include any kind of enterprise that uses resources, especially human resources, to perform projects. We sometimes use the word enterprise interchangeable with company. Skills include, for example, the abilities of an employee, for example, technical writing, while qualifications include, for example, a degree in a technical field. Experience is a representation of, for example, how much work an employee has done in a given area, while expertise is a representation of, for example, which areas an employee has specialized in, either while with a company or before, and does not necessarily correlate with formal qualifications. By "resources" we mean to include human resources and other, non-human resources.

These four factors—skills, qualifications, experience and expertise—are all attributes that qualify a resource (e.g., an employee) to do a particular job, and may be called qualifying attributes. As shown in the figure, a variety of different qualifying attributes are represented by each of the employees; for example, skill a may involve technical writing and be shared by employees 16, 22, and 26, while skill b may relate to facility with Microsoft Excel and be shared by employees 18, 20, and 26.

Figure 2:
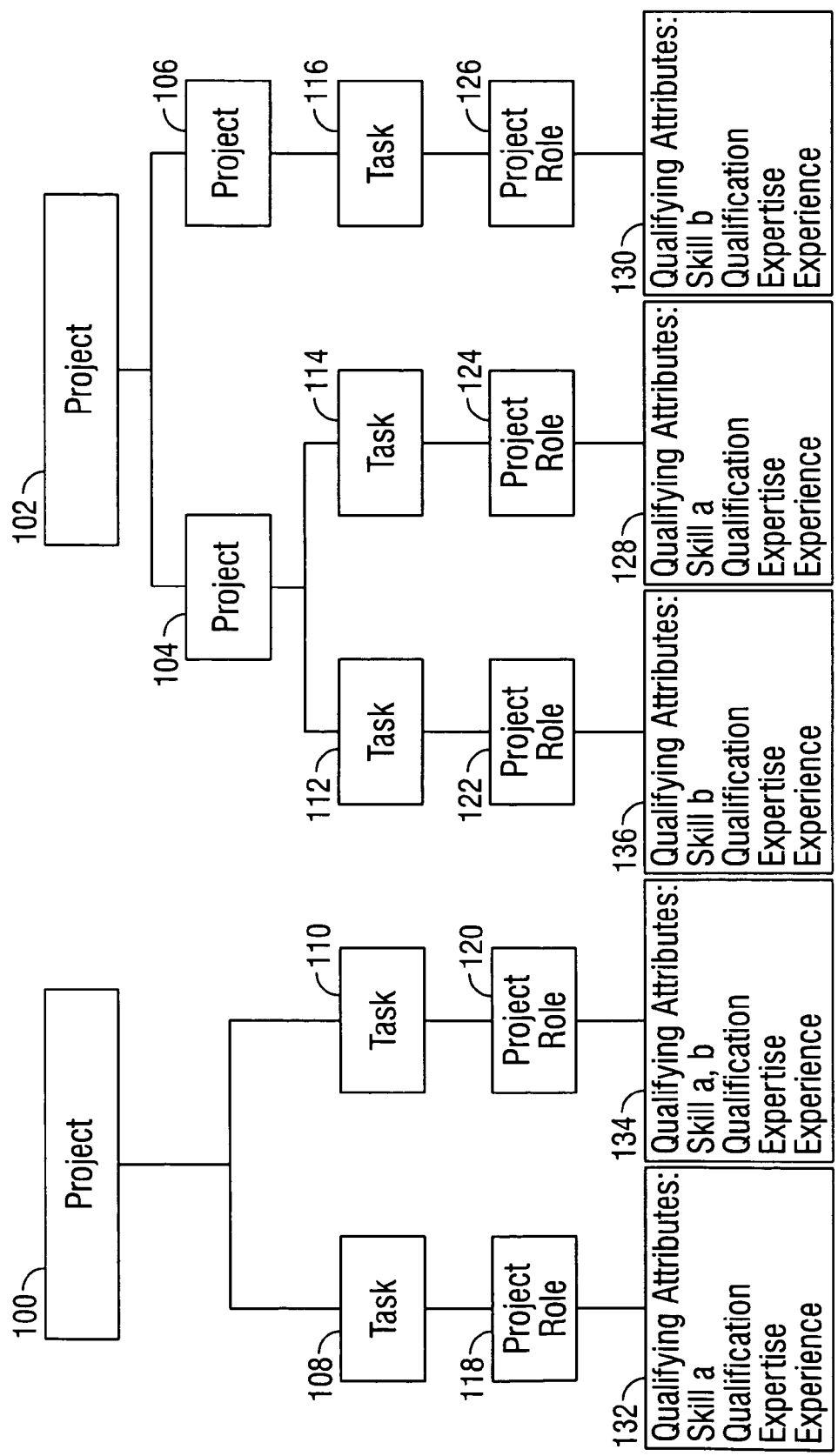

From time to time, a company undertakes certain projects related to its business (FIG. 2) 100, 102, 104, and 106, including projects that are internal to the company and projects commissioned by others such as customers. A typical project may be staffed by a set of employees who play various roles 118 through 126, depending on their qualifying attributes. Examples of these roles are project leader and consultant. A project role is a generalized representation of a set of qualifying attributes without an association to any specific individual who has that set of qualifications or is assigned to that role. Project roles may be of various types. Each project role may be defined specially with respect to a particular project or my be based on pre-defined project roles.

The projects are made up of separate tasks to be completed 108 through 116, each of which will correspond to one project role 118 through 126 that has appropriate qualifying attributes 128 through 136 for that task. For example, the task of data analysis may be performed by the project role of analyst 122, which may later be assigned to an employee 18, if the employee has qualifying attributes 136 that form a suitable match with that role, such as the skill 42 of working with Microsoft Excel, which is a necessary qualifying attribute 136 for filling the role of analyst.

While a manager needs to know employees' qualifying attributes to assign an appropriate set of employees for a project, other information forms part of the decision-making as well. For example, cost plays a role in project planning: for some project tasks, an experienced employee may be unnecessarily costly. Also, if an employee is used in too many projects, the company may have to pay overtime, while under-using other employees. The measure of the proportion of time an employee is working during a given time period can be characterized as his utilization. In addition, whatever the utilization of employees, some projects require the employees to be free at specific times. This measure of availability can be determinative in assigning employees to tasks. Utilization and availability are measures of an employee's work capacity, and thus these criteria can be called capacitive attributes 53 through 64.

Managers 10, 12, 14, 15 are in charge of managing projects and allocating resources—both people and materials—to projects. Some managers are charged with managing only employees, others manage both employees and projects, while other managers 15 manage projects or tasks using employees whom they do not directly supervise. Managers (which we sometimes call project planners or project managers or planners) know the tasks 108, 110 that are necessary to complete a project 100, the roles (and in turn which qualifying attributes 132, 134) that employees must have to be competent to perform the tasks, and how much time and material resources should be allocated to a given task within a project.

However, managers in the company may not know about all of the resources available to them to perform tasks because of the size and geographical span of the company. The employees may work in different offices 4, 6, 8, or from their homes 9. To manage resources efficiently, a manager not only needs to know the financial constraints on a project and the project roles necessary to its completion, but also needs a mechanism by which to identify resources that have the appropriate qualifying attributes and capacitive attributes to fill the roles and perform the tasks.

Figure 3:
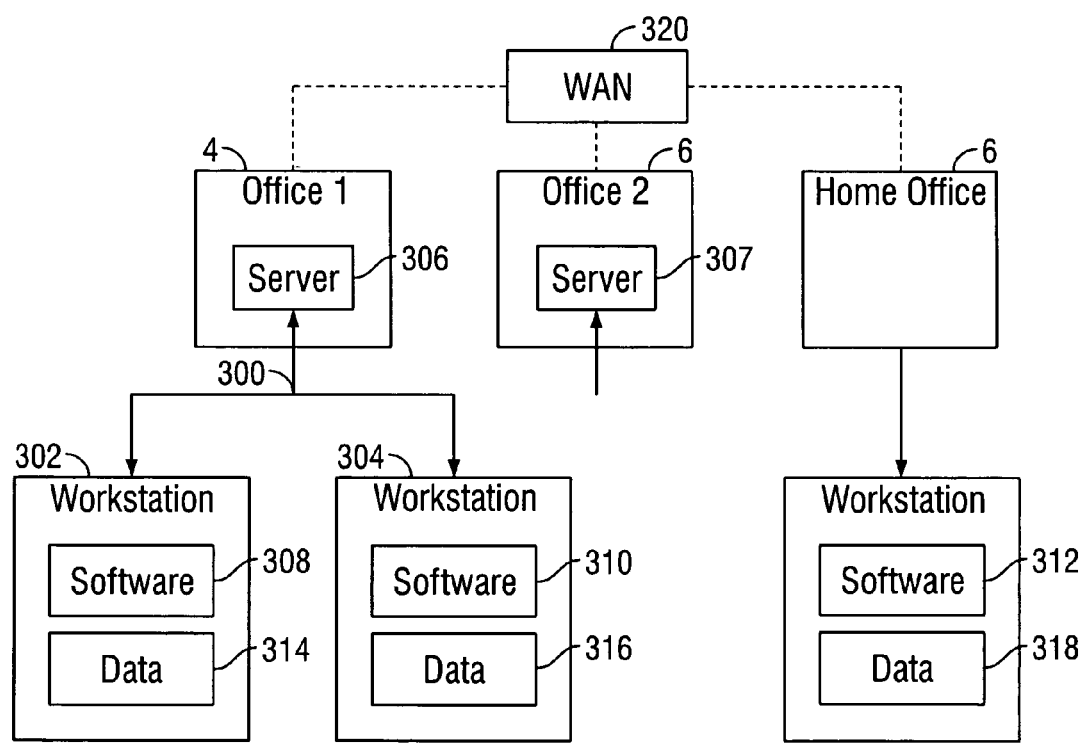

In managing projects and resources, managers typically are aided by software running on workstations and servers. As shown in FIG. 3, each office of the company 4 typically has a local area network (LAN) 300 connecting individual workstations 302, 304 to a common server 306. Each work station has software installed on it 308, 310, and contains whatever data the user has created or uses 314, 316. Offices (both those with multiple employees and home offices 6) are connected by a wide-area network (WAN) 320, which can be, for example, the internet. At a home office 6, the workstation also runs software and stores data.

Figure 4A:
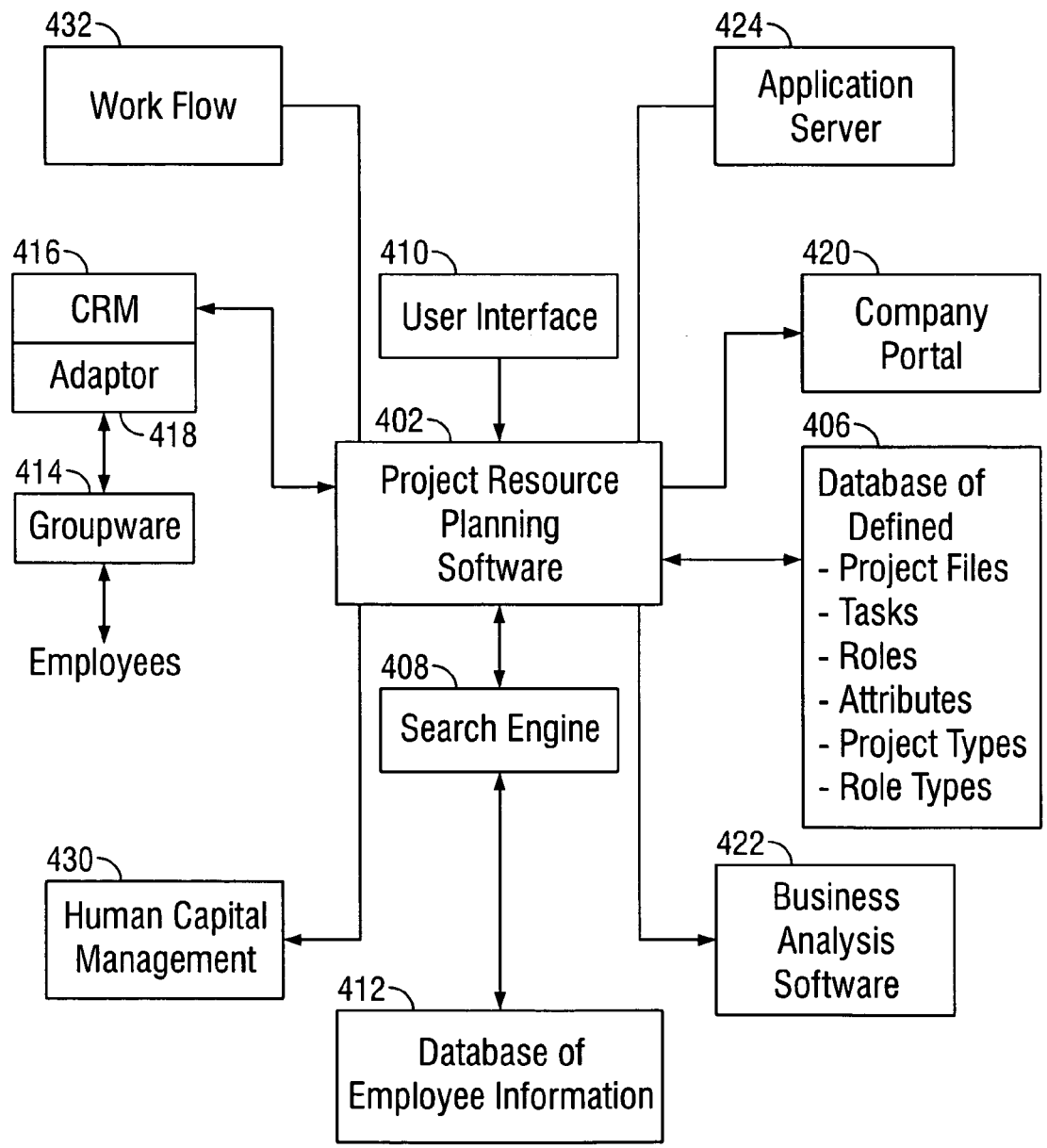

The process of identifying appropriate resources for projects and tasks of projects is made simpler by project resource planning (PRP) software 402 (FIG. 4A) that enables managers to define and plan projects and tasks in terms of roles needed to perform them, and then separately and possibly at other times to find employees who have the appropriate qualifying attributes and capacitive attributes to fill the roles and perform the tasks. The PRP software may run on one or more of the servers and/or one or more of the workstations.

Overview of Defining Projects and Searching

The PRP software gives managers the tools to define the needs of a project and make it easier to look for the resources that will satisfy those needs. Working through a user interface 410 (FIG. 4A), the manager defines (for storage in a database 406) the tasks that make up a project, the project roles necessary to the project, the qualifying attributes and capacitive attributes that each role should have, and which of the tasks are to be completed by each role. (Alternatively, the manager may use pre-defined roles that are already associated with sets of appropriate attributes and are suitable for defining the roles needed for the tasks.) A search engine uses the database information to identify, in another database 412 of employee information, qualified resources who are available at the specified times or during the critical time periods. As information about tasks and assignments changes as the project progresses, the database 412 (which is maintained centrally) is updated. When tasks and assignments change in the central system, employees are notified through a standard commercial groupware program 414 (such as Microsoft Exchange/Outlook or Lotus Domino/Notes) with which they are already familiar.

Figure 18:
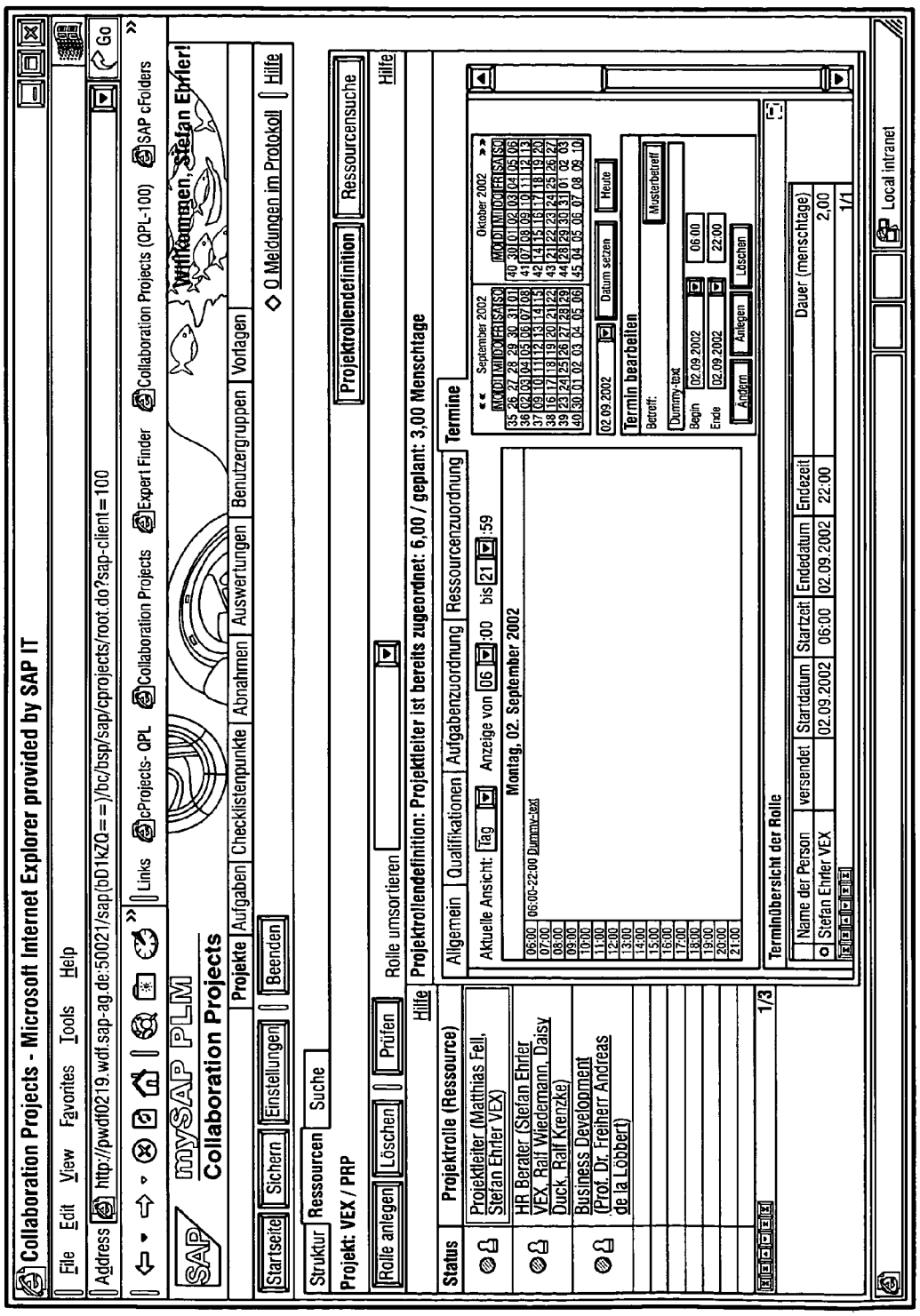
Figure 19:
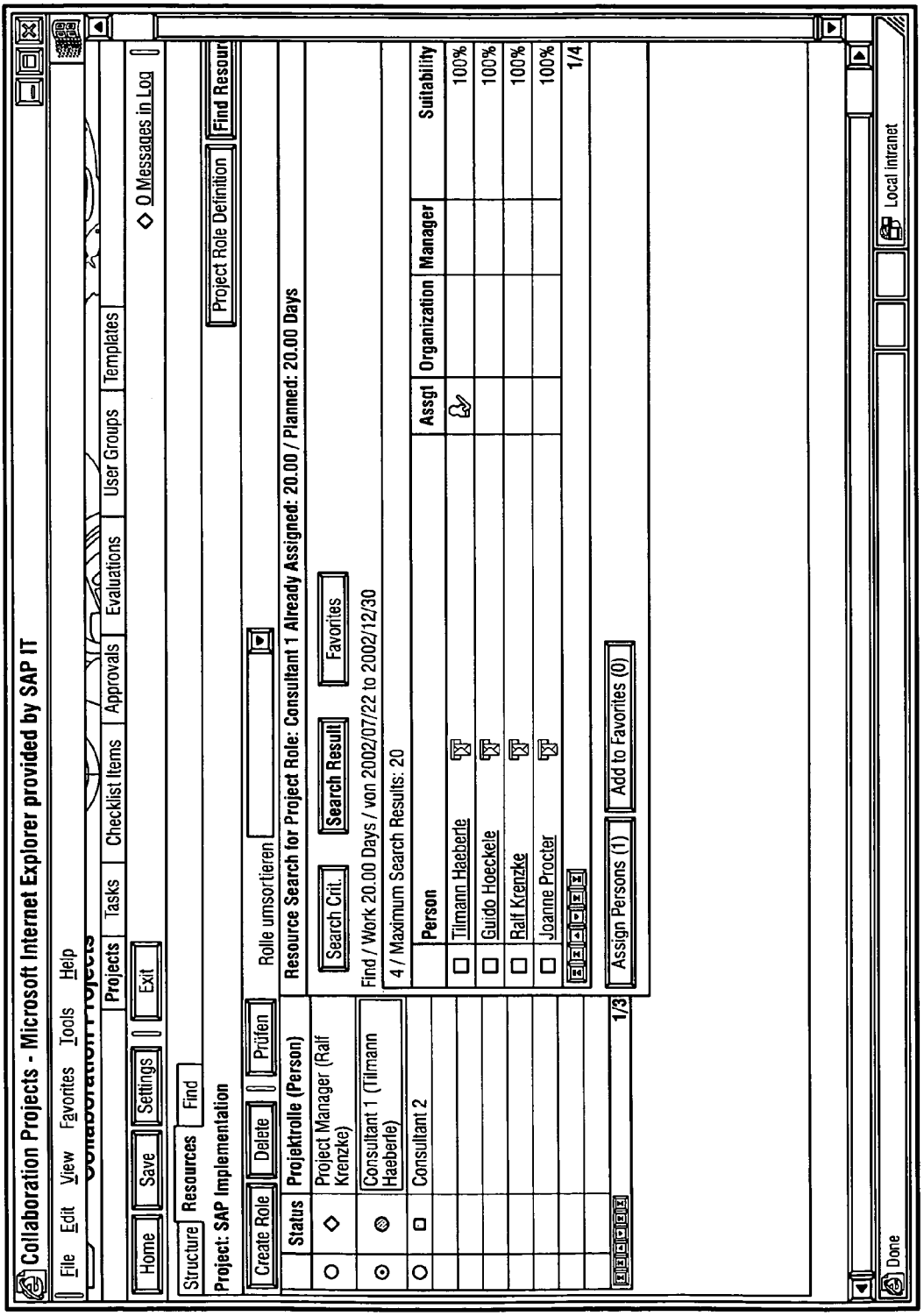
Figure 20:
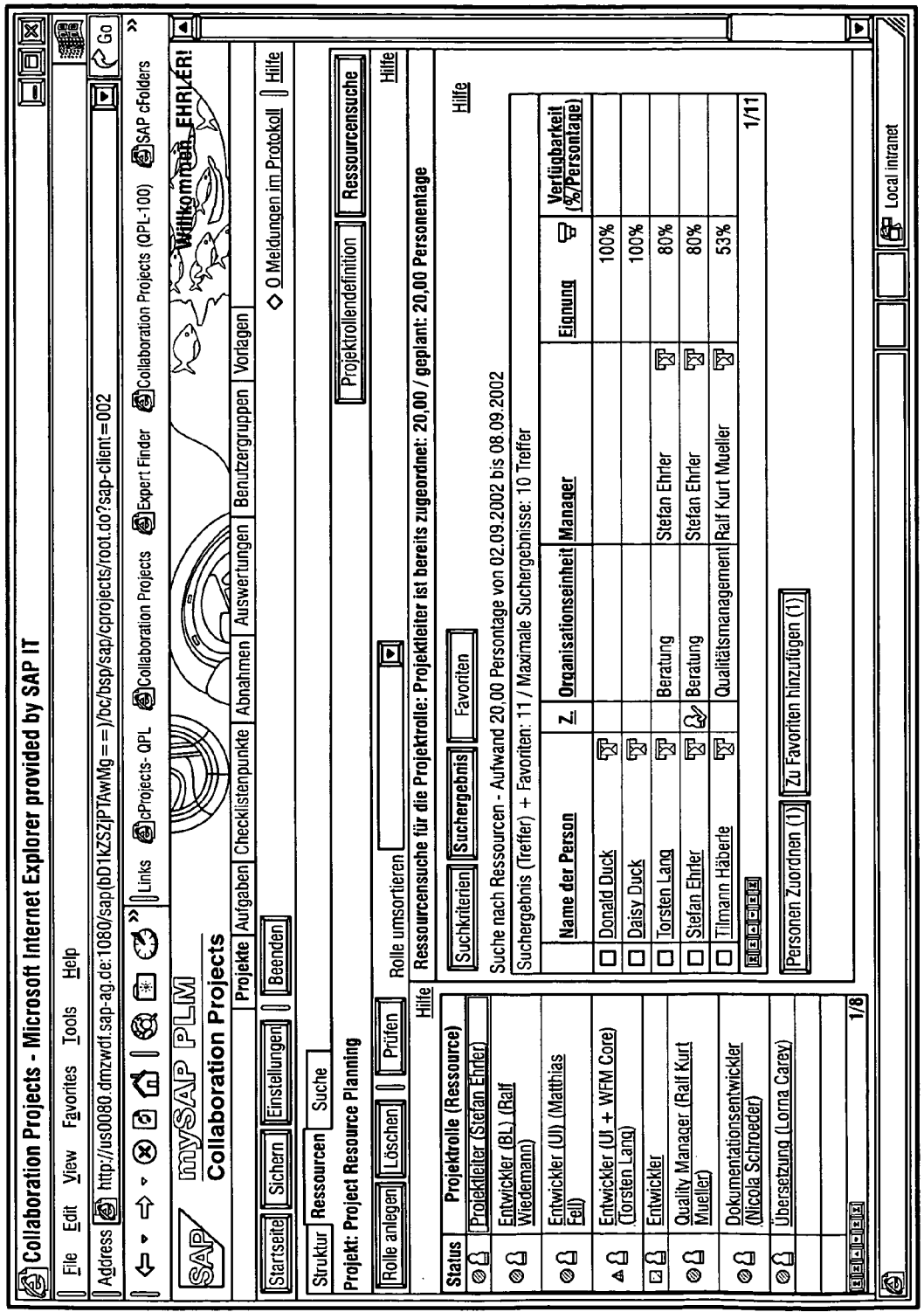

The project roles are defined and entered without having to choose a specific person who possesses the required attributes. The project planner need not have someone specific in mind when setting the needs of a project. Conversely, the manager can use the search engine to run searches based on qualifying or capacitive attributes without having created a project, or before creating the project, in order to have an idea of the available resources. As indicated in FIG. 18, during searching, the attributes (qualification requirements) associated with a role can be marked as "mandatory" or "optional," as the project manager wishes, for purposes of searching. FIG. 19 shows an example of displayed search results. FIG. 20 shows search results with utilization analysis separated by hard booking (committed) and soft booking (tentative).

Once the necessary project roles have been determined, the PRP software allows the project manager to assign the defined tasks to abstract resources, that is, to project roles. The assignments are then stored in database 406. For example, the project role of consultant may be assigned the task of doing a cost-benefit analysis (taking 7 hours), to be presented at a one-hour meeting on Nov. 5, 2008. This assignment is stored before the project manager has decided who will fill the role of consultant. This means that the full project can be planned before any people are assigned to a task, which allows for more comprehensive planning at an early stage. It also means that once assignments are made, employees will know exactly what tasks the assignment entails. It is also possible to assign tasks after project roles have been filled by specific resources.

The PRP software also allows the user to search the database of employees by capacitive attributes. Using capacitive attribute searches in conjunction with qualifying attribute searches allows the project manager to determine assignments through analysis of both data sets.

Assigning Tasks to Resources Temporarily and Overbooking

When assigning tasks to resources, the project manager may not be certain that the task will be accepted by the resource, or he may wish to assign someone temporarily, pending more information. The PRP software gives an option of marking selections as tentative assignments, rather than as default committed assignment. When others access the database 412, they will be informed of the status of that assignment. A project manager can elect to search the availability and utilization categories in the database 412 only based on fixed (i.e., committed) assignments of resources, or using both tentative and committed assignments.

The PRP software allows an employee to be over-booked, that is, scheduled for time commitments that represent more than 100% utilization, whether the assignments that cause them to be over-booked are tentative or committed. This is at the discretion of the project manager.

WFM Core

The database 412 may, in some implementations, be a work force management (WFM) core, such as the one available from SAP AG of Walldorf, Germany. When a resource is assigned to a role by the PRP software, the WFM core is updated, so that all utilization and availability data is current. Through the PRP program, it is possible to search the WFM database 412, thus checking availability and utilization with respect to all resources within the organization that are tracked in the WFM database. PRP software then allows for the tentative or committed assignments to be made for a given resource. These assignments can be changed at any time during a project without losing the information associated with the project role. This is true even if a role is unfilled for a period of time.

Company Portal Posting

At the option of the project manager, vacant project roles may be published or posted in a company portal 420 that is accessible to all employees. This allows available employees to sign up for available project roles, or allows their supervisors to do so for them.

Groupware Link

The PRP software is set up for integration with groupware applications 414, for example, the Microsoft Exchange and Lotus Domino servers and through them the client-related software: Microsoft Outlook or Lotus Notes. The SAP add-on CRM (Customer Relationship Management) or a similar CRM system 416, contains groupware adaptors 418, such as CRM middleware. The PRP software provides the integration between the groupware and the WFM core 412. Employees are thus informed of the assignments that have been made in the WFM core through their office groupware. Any changes in tasks or assignments made by those involved in the project are recorded in the WFM core through the groupware integration and will be visible in the PRP application.

Through the PRP software, reports on individual projects can be obtained. The reports show, for example, an overview of all project roles and resource assignments for a project. The PRP program may also be integrated with business analysis software 422, such as SAP's BW (Business Information Warehouse) program. Through BW, it is possible for employee utilization and availability data across all projects to be analyzed. After the data is analyzed, a general report (encompassing multiple projects) can be prepared in the PRP program.

The PRP software uses the services of an application server program 424 (for example SAPs application server) running on at least one of the servers in the corporation and thus accessible through LANs and WANs to at least some, perhaps all, of the company's workstations. The application server provides a range of functions for data management, and can be enhanced by add-on software programs. Add-on programs can be organized in suites, such as the add-on Collaboration Project Suite.

The WFM add-on program 408/412 contains a database of human resource information and software to access it. The database keeps track of the qualifying attributes and capacitive attributes of employees. The PRP software interacts with this database and extracts information in ways that are most convenient for resource allocation planning. PRP allows the user to search through resources based on criteria of qualifications, experience, availability and utilization.

The, the human capital management (HCM) Extension Set 430, includes "expert finding" capabilities.

Project Life Cycles

Figure 7:
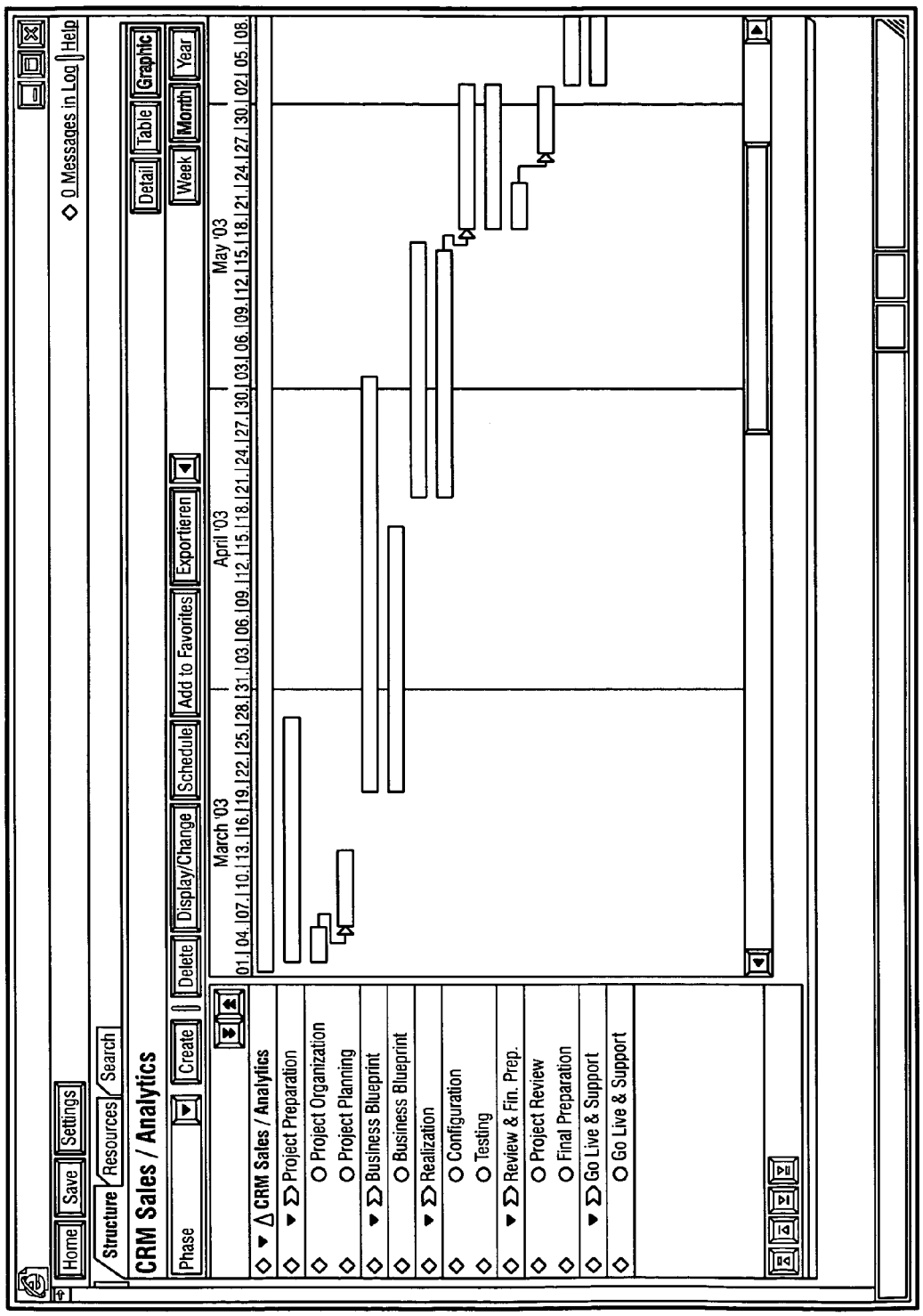

As shown in FIG. 7, the CRM program 416 specifies a typical sales cycle for a project. The life cycle of a project—apart from the sales or service life cycle—runs in parallel, e.g., within the CRM and will go through a process of becoming more concrete throughout the cycle.

Figure 4B:
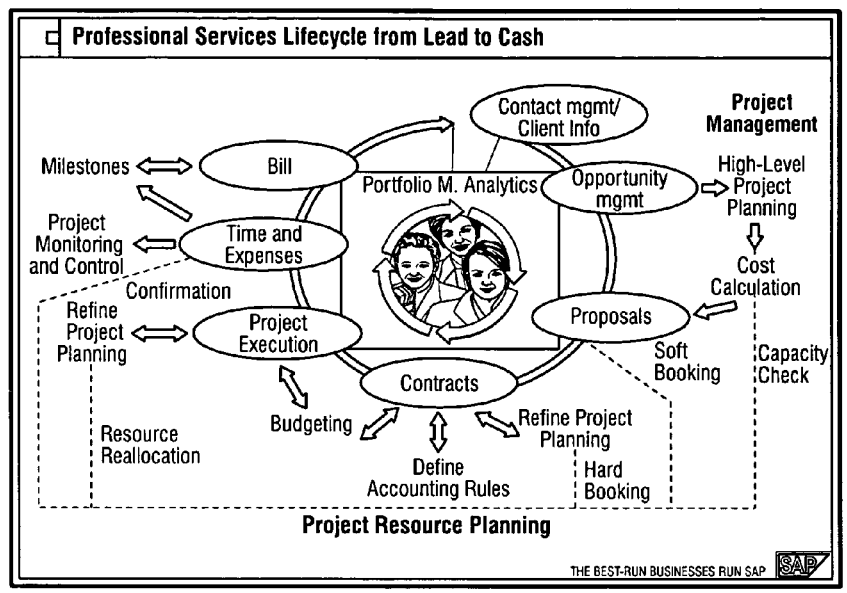
Figure 14:
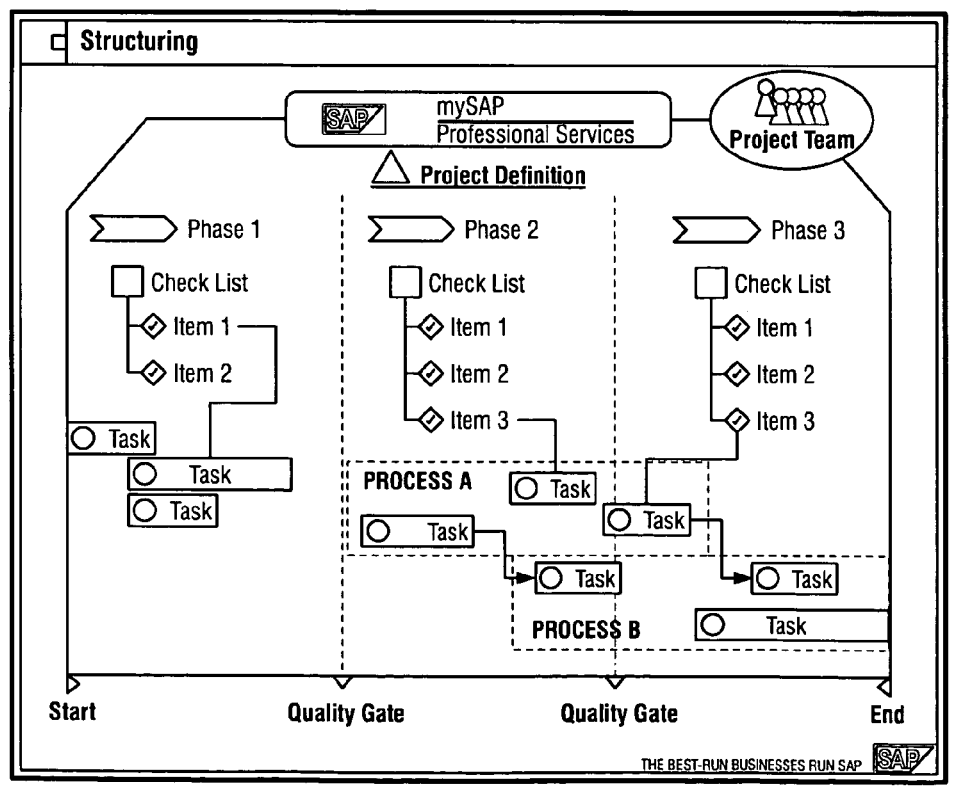
FIG. 14 is a flow diagram.

As shown in FIGS. 4B and 14, projects in companies have life cycles that include phases. For example, a beginning phase may be an engagement phase, when the company is trying to bring in a client. The company will make estimates of what services it can provide a client and how much that will cost. In the offer phase, the company and client negotiate on these matters. During these phases, plans are not yet complete, yet feasibility and cost estimates must be made.

Early in the engagement phase, projects are defined as either planned or created. A planned project is one for which the resource needs and phases have been mapped out. A created project is one whose details are not entirely certain yet. Only the outline or existence of the project has been created. The capacitive attribute check as well as tentative employee-scheduling information for a project can take place during these initial client negotiations. The roles and tasks or requirements of the project can be roughly specified during this offer phase.

The projects become more concrete throughout the project life cycle. For example, the project will be refined in the offer phase, because pricing is necessary for the offer. When a client accepts an offer, an order is generated, which results in the project becoming concrete (and being designated as released); after that, the resources are committed and definite customer meetings are fixed.

The project is exposed to constant changes during the fulfillment phase of the project. Positions may be newly assigned (for example, as a result of a failure in planning). The project may be under-assigned or over-assigned. New tasks may be added or dropped. Assignments may be changed. During the fulfillment phase, overhead and costs (travel costs, expenses) for the project or for the individual tasks are recorded (and designated time and expense). The project progress is tracked. When project tasks are completed, they are reported as such.

Types of Projects

Projects can be classified in different categories including professional service projects (such as consulting) and spot-consulting projects (short projects that only require the performance of one task for completion).

Figure 5:
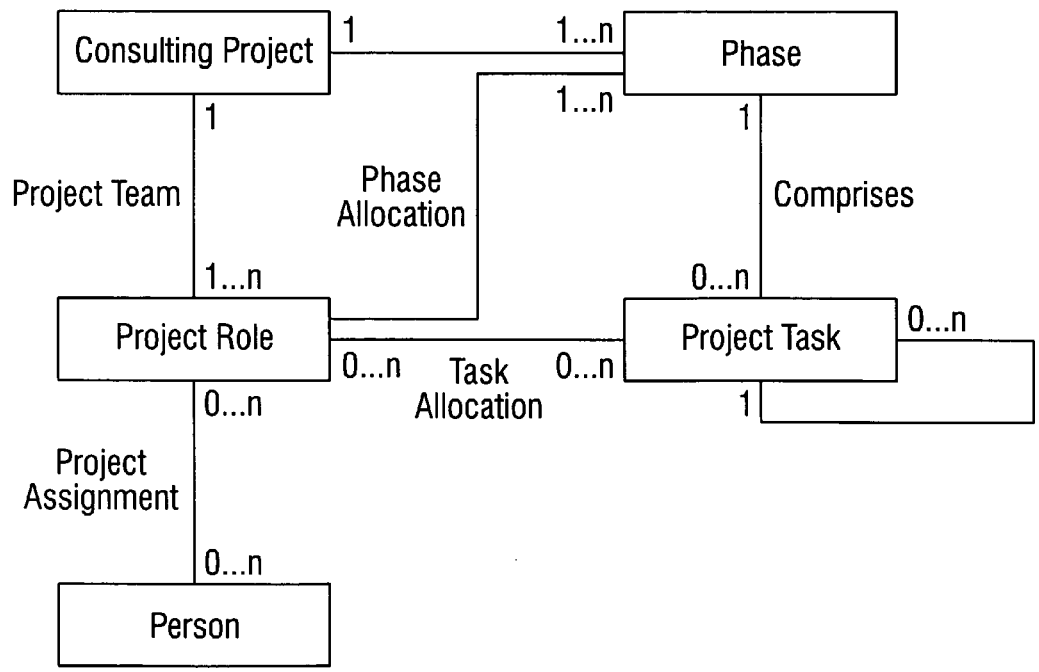
Figure 6:
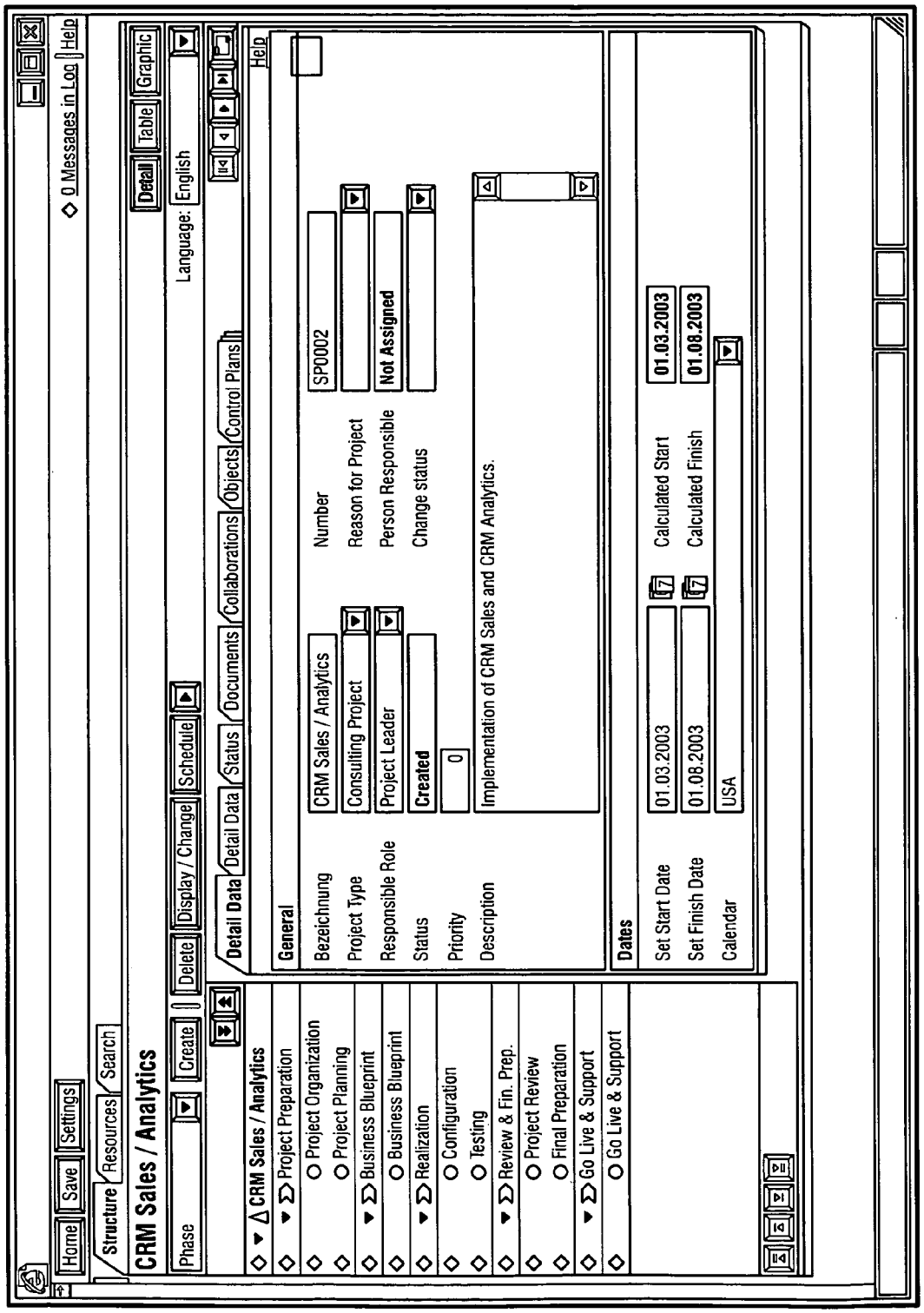

As shown in FIG. 5, consulting projects are accompanied by a list of project roles, structured sets of tasks (project tasks) and their relationships. They can be defined by a set of phases of the projects. The project tasks can be defined through event-relationships as predecessor and successor.

The project types can be chosen by the project planner during project creation in a customizing feature (or, depending on the language, in a text table) of the user interface 410. A set of predefined project types, e.g., development-projects, consulting projects, and spot-consulting projects (mini-consulting project with overhead <10-20 days) may be supplied with the project resource software, stored on the database 406.

Controlling of the User Interface

The project types 406 help control the user interface 410, so that certain interface elements can be hidden or shown based on settings for the project type. This simplifies the interface and hides those functions that are unnecessary to a given project type. For example, for a professional service project, a complex search for suitable resources may not be necessary if the resources are manually assigned to the project. However, for a consulting project, a complex search function for suitable and available resources in database 412 is useful. For a spot-consulting project, phases, checklists, and collaboration typically are not necessary.

The user can customize settings for each project type. For example, resource searches in database 412 can be made active or inactive. Also, the time units that are entered and measured can be specified as workdays, hours, etc. The user can elect to hide phases of a project (in which case a dummy phase is generated in the background and is not seen on the interface). Checklists can be designated as being active or inactive, as can collaborations. The available project role types are dependent on the project type.

Identification and Management of Projects

Every project has a 24-digit external project number, which is the external key for the project. Internally, the project is uniquely identified through a generic unique identifier (GUID). Besides its external project number, every project is also associated with a 40-character short text, which represents the name of the project. The project can be defined through any free text.

The data concerning a project is stored as a project file in the database 406. The project file may be reached through the user interface 410 using the identifiers.

Project Role—Responsible Party

A project role called ordering party (also called the responsible person or project planner) exists for every project, regardless of project type, and will be displayed to all users. The ordering party can be designated as either an attribute of the project or as a separate project role in the project. The ordering party is the user who is in charge of locating and assigning resources to the project. A responsible organization unit is also assigned. The responsibility for the project can thus be fixed in the organizational structure of the project. Typically, the manager of the organization unit is the responsible person. However, the responsible person need not be assigned to the responsible organization unit. It is necessary for at least one of these categories (responsible person or responsible organizational unit) to be designated.

A priority value can be used to state the importance of the project. Different priority categories can be chosen by the user in the customizing feature (or in a text table) of the user interface.

Project Roles

The set of project roles for a project describe all the resources (e.g., people) for the project, e.g., the project team.

The types of project roles that can be used in the definition of a project are specified as project role types using the customizing feature (or, depending on the language, in a text table). The project role types that are defined within the customizing feature are dependent on the particular project type and can thus be different for different project types. In consulting projects, for example, one typically defines the project role types as project leader and consultant. In development projects, the necessary project role types are usually project leader, developer, architect, etc.

The number of project role types could be limited by customizing and may coincide with a management description of all possible project roles for all project types. The business management descriptions are defined within the customizing feature. In consulting projects, for example, the number of possible project role types is fewer than ten. It is expected that the project planner will think about the management early in the project life cycle, before projects are defined, so that the necessary project role types are available. Linking of the project roles to information maintained in the CRM 416 add-on allows the project roles to be priced.

Various project role types may be defined for a variety of project types, as different project roles are associated with different project types. For example, the role of project leader appears in all project types, whereas consultant appears only in consulting projects.

Other attributes can also be selected in the customizing feature. Among these are required qualifying attribute requirements, such as descriptions of generic qualitative requirements (from a qualifying attribute catalog) of the project role type. Also there are authorization options, which allow the user to set limits on what project roles are authorized to do. The project leader, for example, has administrative authorizations for the project and can change entries through PRP.

Project roles are also identified as either relevant for resource planning or not, based on whether the role has any concrete commitments. If not, the role is marked as irrelevant, since no human resource requirement is created in the WFM core for these project roles.

The attributes of the project roles, which are stored as customizing information, are expressed as suggested values that can be changed or modified during project management or resource planning. For the qualifying attribute requirements, certain general qualifying attributes should be defined. For operative project management, the qualifying attribute requirements are specified more precisely. The authorizations can be changed while defining the project.

The User Interface

In the user interface, a user has an overview of all project roles for each project, all assignments of resources to roles (including their start and end dates), and overhead, both planned overhead and already covered overhead (see FIG. 15). The name of the project role is initially taken from the project role type as the suggested value, but can be modified, so that it is clearly visible in the overview. The name of the assigned employee is also shown on the overview, along with a time period for the work, and the overhead.

The client can set which columns are visible by customizing the interface.

The assignment of an employee to a project role can be directly recorded by a project planner without using the search function. The user can assign project roles directly in an overview screen of the user interface, e.g., if the project role assignment has already been arranged outside the system. Deletion and copying of project roles is likewise possible directly through the overview screen.

Each project role is associated with a series of attributes that are not directly displayed in the overview screen. To access these, navigation into the project details is necessary. The additional attributes are project role type, project role, overhead, description (describing the project role in terms of tasks or qualifying attribute requirements), and preference for a particular candidate. The preference option does not produce an actual assignment, but serves only as a filter criterion, so that the desired candidate is always added or included with the search results. Resources are identified as either internal or external to the company.

In the user interface, the required qualifying attributes for a project role may be selected from a qualifying attribute catalog. The qualifying attribute requirements can be marked as mandatory or optional. The qualification catalog distinguishes between qualification groups and qualifications. Qualification groups are an organizational tool that structures the qualifying attribute catalog; they cannot be used as concrete qualifying attribute requirements for the project role.

It can be specified that the project roles only be filled by employees who hold a certain job or is part of one/some organizations within the company.

A project role can be assigned to one or more tasks even though no specific person holds the project role for the task assignment. The project assignment planning can be performed after the task assignments are made. When assigning tasks or project roles, the user can specify the time period or time interval for the task and the overhead. When the two are being split between different employees, this can be specified.

Employees who have responsible roles in a project can be assigned directly to a project role without using a search function. For example, the project leader will typically be assigned outside the system, and then his name can be entered into the system.

A single project role can be assigned to multiple people, but only in disjunctive time intervals. No more than one employee can be assigned to one project role at a time. If several people are assigned at the same time, multiple identical project roles are created by copying.

Project roles can also be assigned to any employees who represent responsible units, including organization units, even though no resource planning is necessary for those employees or units. For example, a representative of an outside firm responsible for a task can be entered into a project role.

It may also be possible to do capacitive planning at the level of organization units. In this case, rough planning of the capacities available in the organization units could be supported.

Figure 10:
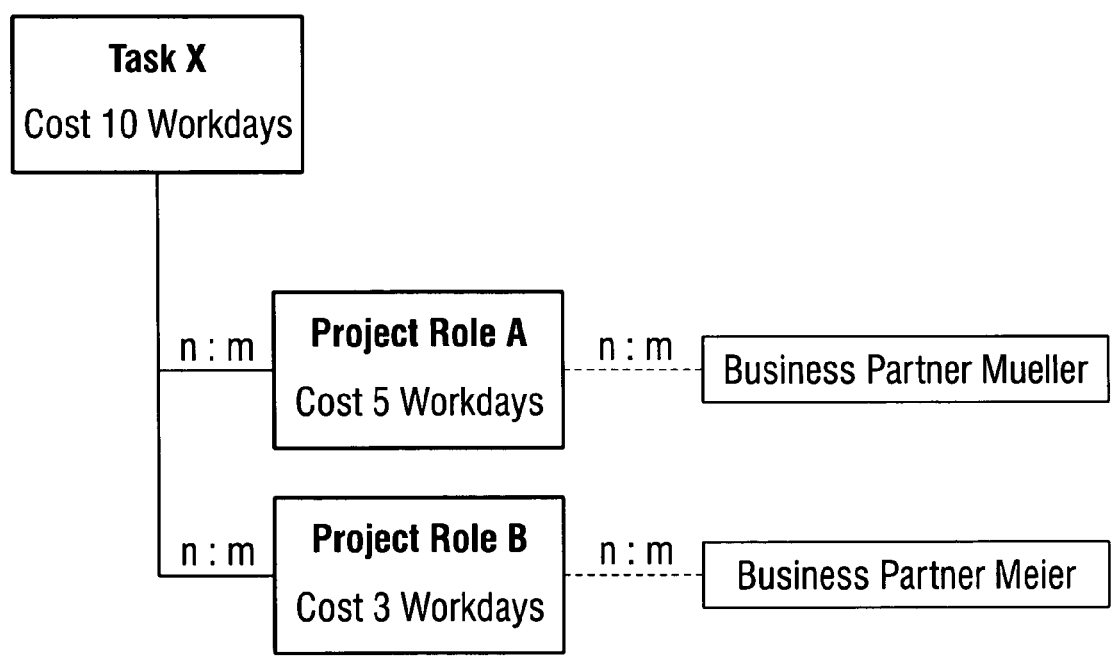

The system is not entirely dependent on the data that has been entered into WFM. As shown in FIG. 10, if the company wants to work with an individual who hasn't been entered into the system (usually an external business partner), that person can be assigned to a project role. To do this, basic data about the business partner can be entered in a separate dialog box, for example, the name, e-mail address, user-ID, address, country, and telephone number of the new business partner.

A project structure template can be stored that contains information about phases, checklists, tasks, and project roles for a given type of project. The template includes associated project roles and can include individual project role assignments. For example, the decision maker roles are often constant across various projects, because these are people with a high degree of responsibility (such as the manager of a certain division). These people can be therefore individually identified in the template.

Search to Assign People to Roles

To assign project roles (e.g., project leader) to specific employees, the search function of the user interface can be used. The search function adopts all the data, for example, attributes, necessary for the search from the project role as the search criteria. The search criteria can also be changed within the dialogs of the search function without affecting the attributes of the project role. Additional search criteria are the maximum number of matches to be shown and project experience (which is a measure of experience with, for example, particular customers, particular projects, or relevant industries). Among the criteria that can be manually specified are the name of a desired candidate, if there is a specific employee desired for the job, certain parts of the organization to which the search is to be restricted, qualifying attributes, and capacitive attributes (including regularly-scheduled meetings), and whether more than one person can fill the project role (at different times), or whether it must be filled by only one employee throughout.

Expert Finder

Other information may be provided by the candidates for a task. The types of information can be set through customizing, and include, for example, use of an expert finder such as the SAP Expert Finder. The search function for qualitative and capacitive attributes can be used in conjunction with the WFM core. The expert finder supports a standard process for expert searches in the entire company, which can be modified to meet the requirements of the company. With the integration of the expert finder into the search function, both free text search and the search for unstructured data (for example, from an LDAP (lightweight directory access protocol) directory, or HR data, jobs/positions, previous employer data, etc.) are supported.

With the expert finder, employees can specify their area of knowledge in an expert profile which is custom made for them. These expert profiles are stored in XML-documents.

Initially the expert profile types, the search scenarios, and the search screens in the application are depicted.

Figure 8:
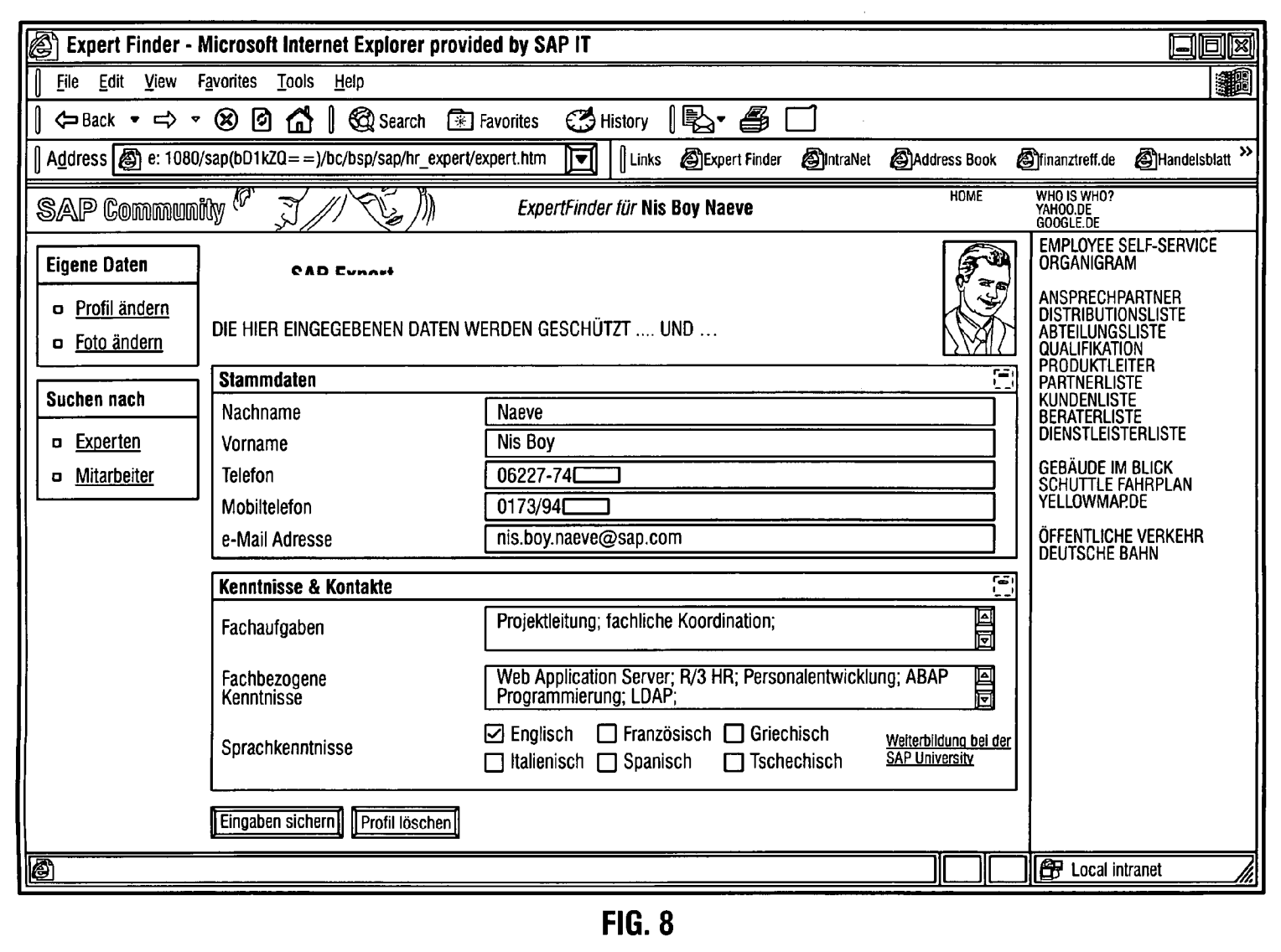

Because employees are involved in many different areas of activities (e.g., as secretary, account manager, marketing specialist), they possess knowledge in different fields. The elements of the expert profile of an employee are distinguished from those of other employees, which is reflected in the fact that in the expert profile of a secretary, for example, elements other than those in the expert profile of a manager can be offered. FIG. 8 shows an expert profile.

Every employee edits his personal expert profile. Master data can be read into the expert profile automatically through an LDAP interface. The employee then fills the offered fields. As soon as the employee saves the inputs, the expert profile is released for search or forwarded to the supervisor for release.

Use of Workflow Add On

By using a work flow application, such as the SAP-workflow add-on, the expert profile of an employee can be verified by his supervisor and then integrated. The expert profile is available for search in the expert finder only when it has been released. For this, the expert profiles make use of a status management, which controls not only the release by the supervisor, but also enables the employee to block his expert profile from the search at anytime.

After a search is performed, a list of candidates is displayed, which the search function has identified from the search criteria. The list contains details such as the names of the candidates, although for users who are not fully authorized to access such information, names are withheld. The name of the person responsible for the candidate (which is usually the manager of the organization unit to which the candidate belongs) is also provided. The candidate name is displayed as a link, and a mail to function (e-mail) is available. The e-mail address is determined from the employee's data. Other details in the list include telephone contact(s) to the responsible person, the name of the candidate's organization unit, and a match value (a measure, expressed as a percentage, of how closely the candidate's qualifying attributes match the searched—for qualifying attributes). If the project role has already been assigned to tasks that have qualifying attribute requirements themselves, these are also considered for the profile comparison. The availability attributes are also considered (for example, a measure (by percent) of the available versus demanded time of the candidate).

For every candidate, one can navigate into a detailed view using a link. The detailed view gives information about how the match values and the degree of availability were derived, and displays other information about the candidate. Besides general details about the candidate, there is also a profile comparison section, which compares the qualifying attributes of the candidate to the required qualifying attributes associated with the project role. If the project role has already been assigned to tasks and the tasks in turn have qualifying attribute requirements, these are considered for the profile comparison. The candidate's assignment calendar is also displayed, as is a list of all projects the candidate has been involved with so far, including the project roles played in those projects.

From this screen, the user can adopt one or more candidates as favorites for the project role, or can redo the search. The initial search criteria are retained, but are extended or restricted by the user.

One or more candidates can now be assigned to the project role. Since a committed project assignment often depends on the consent of people being assigned or those responsible for them, the candidate list is initially shown as tentative. The tentative reservation can be converted into a committed one after approval has been obtained.

The candidate list for the project role remains until the user deletes the candidate. Thus when changes in management occur, for example, one can resort to the former candidate again and again. The favorite list is retained in the PRP application database 406 and is not part of the WFM core. The management of the favorites list is left to the user himself.

A role assignment can be marked as tentative or committed. Begin and end dates are also marked, as is the overhead (which is measured in units customizable to the user, such as workdays). At the time of assignment, there is an option to input free text relating to a choice.

Within a project, people are planned under various parts of the project in one workflow or work is distributed to people, i.e., time specifications are established for employees and business partners. These allocations are managed centrally in the WFM core. On the other side, the involved employees must be notified of their assignments.

Groupware enables employees to handle email, assignments, and tasks. By integrating resources with the calendar appointments, multi-phase planning is possible, i.e., detailed planning (assignments) can be adopted directly from the employees themselves. Groupware integration ensures that changed assignments (appointments and tasks) are synchronized with the WFM core.

Tasks as Part of a Project

Figure 9:
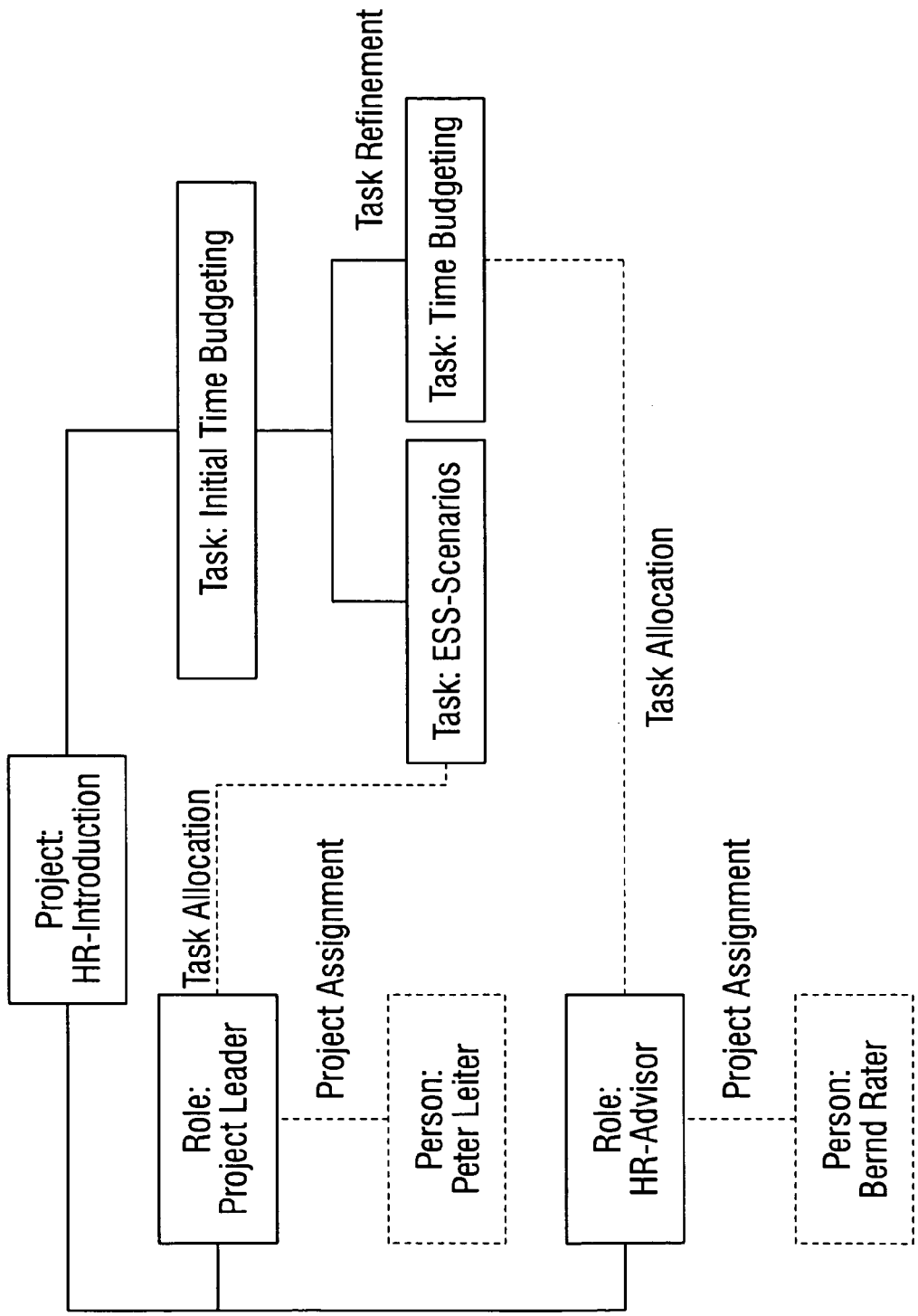

As shown in FIG. 9, besides the project roles, there are tasks to be completed in the project. Even without a reference to project roles, project tasks can be defined in a consulting project. The project task contains, like the project role, a time definition, qualifying attribute requirements, and overhead description. The project tasks can be structured hierarchically, in a tree structure, i.e., a refinement of tasks can be done at any time in the consulting project.

The task assignments can take place without people already being assigned to the project roles. The planning of consulting projects can thus be done anonymously. This is because during the project assignment planning, not only the specifications in the project role, but also those of the assigned tasks, are to be considered.

The definition of project tasks within a consulting project is not mandatory. The project roles can be used to find and allocate suitable and available people in the project assignment planning.

The project tasks are defined within a phase or a checklist item of the project. The project tasks are defined by the qualifying attribute requirements and overhead (which correlates with capacitive attributes). The required variants for qualifying attribute requirements are selected from a scale model. The attributes can be marked as mandatory or optional. The qualifying attribute catalog distinguishes between qualifications groups and qualifying attributes, wherein the relevant scales must be set up for the qualification groups.

A task can be assigned to one or more project roles. Therefore, the sum of the overhead in the tasks and in the project roles may not be equal. Yet these are merely alternate views or a different distribution of the total overhead in the project. Ideally the total overhead in the tasks corresponds exactly to the sum of the overhead in the project roles. However, this status is not a prerequisite to continued planning, as it is typically fulfilled only in a fully planned project.

Based on the definition of project roles and project tasks, human resources are required that reflect the attributes associated with the project roles and the topic-oriented or process-oriented attributes within the project that the project tasks describe. This human resource requirement is stored abstractly. Both the human resource requirements and the resources and assignments are centrally stored.

The WFM core contains all availability information and qualifying attributes of employees, including all assignments that have been planned for the employee.

Figure 12:
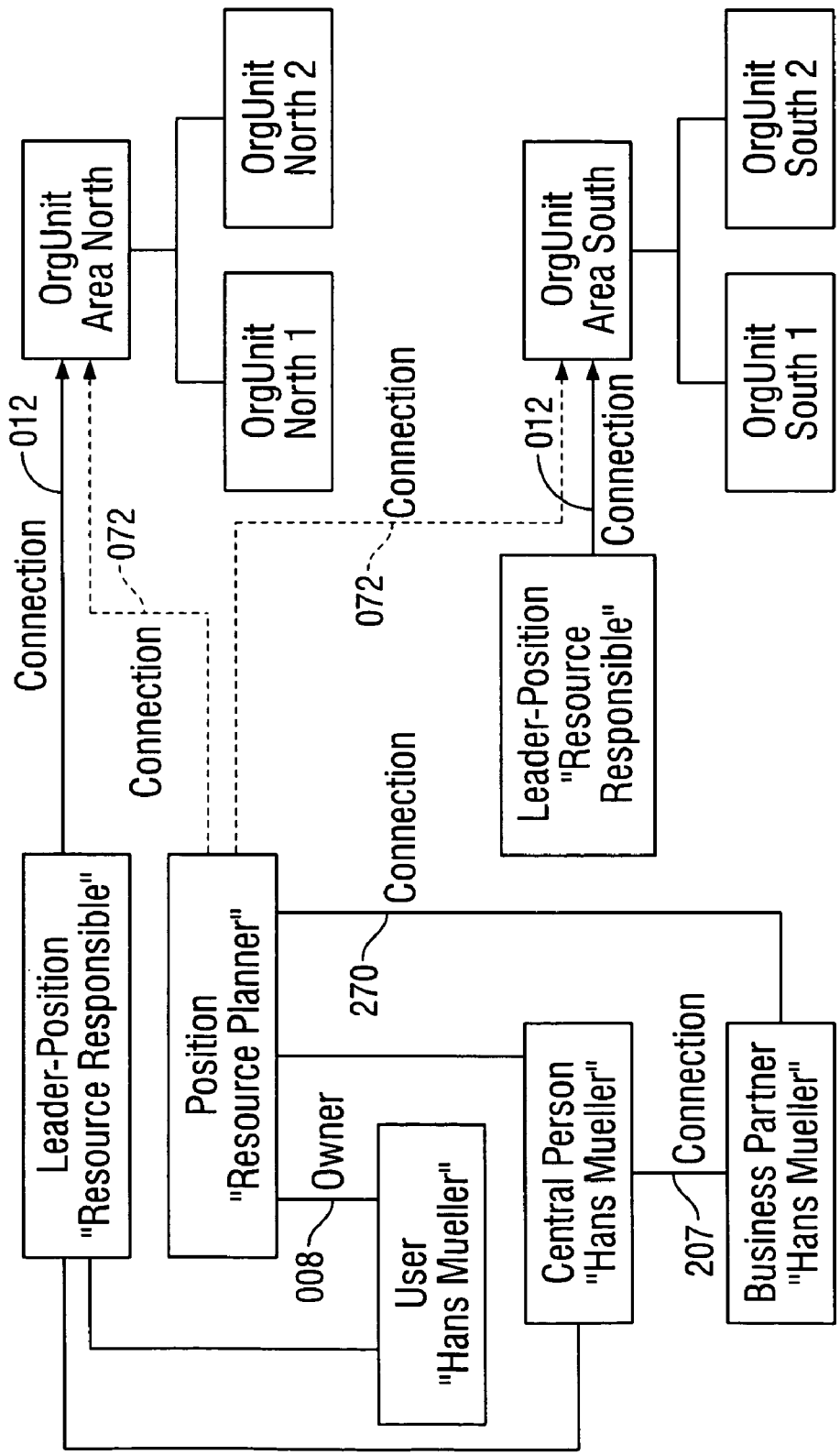
Figure 13:

As shown in FIG. 12, a user is either directly allocated with the organizational structure unit position through a link, or is allocated as a business partner indirectly through a central person to the position. The position can alternatively be linked through a simulated link directly with the business partner. This simulated link is used especially for analysis and analysis methods. In this arrangement, the central person does not appear on the interface.

The position of project planner need not necessarily have a link, and thus also manage the disposition of his own resources. When this link is not maintained, but the user has to execute the task of project planning, an approval process is necessary with the responsible person. The approval is not necessary if the planner is also the manager of the organization unit and thus is also the resource-responsible person. The position can be delegated from the responsible person to the project planner. It is not necessary that the position be present in the same organization structure for which resource planning is done. The position resource planner has a link with all organization units, for which the position is competent in the sense of disposition of resources. The semantics is inherited along the organization structure, i.e. the position is likewise competent for all its subordinate organization units.

While creating a project, a current user is identified first as a business partner. This business partner is used as the suggested value for the responsible person, and the value can be changed.

A project can be assigned to a responsible organization unit that is specified while creating a project. For finding suitable organization units, so-called workflow rules can be used. The user may declare his organizational structure units (organization units and positions) competent for certain areas.

Rules are defined by specifying competencies for certain criteria (e.g., of the customer or business partner). The rule definition is of the type "competencies," because the competencies for certain criteria and the depiction in organizational structure units are defined in the rules. For this, the customer may create new competencies by filling at least some predefined container elements. The relevant organizational structure units are position, organization unit, and person.

Examples of competencies that concern the customers are the role of the business partner (e.g. customer, goods receiver, ordering party etc.), address (e.g. ZIP code, country), line of industry, and marketing features.

The workload for a project is determined from the competence of the user for these projects, based on his organizational assignment. Each project has information stored on who the competent people are-both the person working on the project and the competent organization unit.

Through a link, the organizational allocation of the user is identified and thus the position and organization unit also. With these details, the relevant projects are selected and placed in the workload.

User Interface

In the navigation of the PRP portal, certain elements can be hidden, since they are unimportant for certain applications, e.g., checklist elements and acceptances. In addition, other elements can be shown, such as a direct search option for resources (without any project reference) and a search option for project vacancies.

Certain tabs can be hidden for certain project types through customizing, e.g., collaborations, control plans, objects links, organization structure, and qualifying attributes. The organization and qualifications tabs are automatically hidden when there is no data available for them.

Certain elements of the project structure may be hidden for certain project types through customizing, e.g., checklists and checklist points. For the structuring of tasks, phases are sensible and not redundant, therefore, phases and tasks need not necessarily be hidden.

In lists within the application, the displayed columns can be personalized. It is possible to hide or show certain columns, so the lists won't be too confusing. For this purpose, there is a suitable dialog, which allows the user to select the columns to be displayed.

Stopping Projects

A project can be rejected or cancelled in relation to a specific employee without deleting the project. A project may also be temporarily put on hold or stopped before it is completed. In an already running project, individual phases or even tasks may be rejected. In such cases, the human resources assigned to the project must be released and the demands and assignments in WFM be deleted with respect to the future. Past assignments are not affected by deletions.

Typically, a running project is not simply rejected, but is scheduled for a certain time and then perhaps rejected. In that case, the resource allocations in the PRP program are archived in the database 406 and therefore accessible later in the project as well as after the project has been completed. The status of "stopped" can also be withdrawn from an employee if the employee is reinstated in his earlier project role.

When a project has been marked with the stopped status, the elements of the project may be blocked from further change.

When WFM assignments are deleted, then, through the groupware integration software, the future meetings and tasks in the groupware for that assignment are deleted. Tasks and meetings that are ongoing are restricted. In future searches, the employees' newly calculated capacitive attributes will be shown. The resources allocated to a cancelled project, like those allocated to a completed project, are released for overall planning purposes. It is not necessary, however, to get the resource allocations for the status stopped over the entire period, since the resources have to be planned once again anyway on resuming the project. A cancelled project can be reset again in the old status. When this occurs, the favorites that were specified remain selected.

A project role can be copied with all the dependent data, including general attributes, qualifying attribute requirements, and favorites. The copying facilitates maintenance when many similar project roles will be defined. The copying function is possible only within a project.

A copy role button is available in the role navigator function of the user interface, separate from the create role button. To use this function, the user selects a project role to be copied and clicks on a role copying button, then the copied project role is selected and its details are displayed on the right side for further processing.

Favorites for one project role can be copied to one or several other project role(s), including favorites that encompass all the project roles.

Besides task assignments to the project roles, the reverse maintenance of role assignments to tasks is also an option. Similar to the task assignments, this view allows the user to look at what tasks must be completed and assign them to project roles, rather than looking at project roles and then choosing tasks. The data that is shown in role assignments is the same as in the view for task assignments.

The responsibility for a task is distinguished from the execution or performance of the task. For an extensive task, only one role can be responsible, but many roles can be assigned to work on it. While non-responsible project roles may be assigned for only part of the specified time-period of the project, responsible project roles must be assigned throughout the time period of the project.

The appropriate roles may be selected for project roles from a drop-down list-box. A basic clarification is to be made, while specifying a responsible role, whether the validity periods of the project role must be checked. Only the project roles which cover the period of the task may be suggested for the selection of the responsible role. In some implementations, the responsible role for a task is simultaneously a processing project role. While specifying the responsible role for the task, this is stored additionally as role assignment of the task.

In the user interface, there is a tab for role assignment to enable detail maintenance of each task. Within the tab, a set of project roles for task processing can be specified in a list (table view). In the list, the same data as in the task allocation can be specified. This includes the start and end date of the project, overhead, and a suggestion for the maximum possible allocation period. New entries can be made in the list using the button that says create role assignment. By means of a dropdown list box, a valid project role should have been selected beforehand. In the dropdown list box, the current resource assignment to the project role is also displayed.

In other implementations, to be able to distinguish between responsibility and execution, the performer and the responsible person are entered manually.

The PRP software forces non-ambiguity about the transitivity by requiring that a project role may be held by no more than one person. Thus, at most one person can be assigned to one task. This special case is controlled by customizing for the project type. The assignment of a person to a task may be split time-wise, but with the restriction to one person. The distribution of overhead is thus always unambiguous, because the overhead is explicitly specified in the task assignment of the project role. Thus, the work load can be clearly determined.

In customizing project role types, the qualifying attribute requirements can be defined so that these are inherited in the application. The customizing view permits the input of qualifying attribute requirements, i.e., the qualifying attributes are available even in the customizing function.

Each project has a feature that contains all the project elements required for resource planning and thus offers an overview of the project. The evaluation contains no information about, e.g., checklists, checklist points, documents, etc. The evaluation is displayed in a tree-like format, showing the relationships among assignments and tasks in different ways. In the first branch, the screen shows the phases that make up a project, the tasks that are associated with each of the phases, the project roles to whom the tasks are allocated, and finally, the employee or business partner who will fill the project role. The second branch displays the group of project roles that make up a project team, the employees assigned to the respective roles, and the tasks assigned to each employee. The third branch displays the project by showing all involved employees, the project roles to which they have been assigned, and the tasks assigned to those roles.

In the overview format, the business analysis software 422 can respond immediately. The analysis offers a three-fold overview by showing all information relating to the project structure, the project roles and their allocations, and the project team (assigned employees) and their assignments. The overview indicates whether and where action has to be taken by the user, e.g., when a task is not completely covered through the role allocation, or a project role is not assigned or not fully assigned.

Within the project, an overview shows all the resources including their role assignments at one glance. Maintaining certain attributes of resource assignment through a list is useful in the change-management function because the maintenance of attributes through the detail screen is cumbersome.

Dropdown menus are used to navigate the project overview. Since all the resources allocated to the project are listed in the overview list, one may close a role navigator leaving the entire screen is available for the list. Then, the columns displayed will be project role (name), beginning time for role, ending time for role, overhead, tentative booking (checkbox), beginning of resource allocation, end of resource allocation, and overhead of resource allocation.

Figure 17:
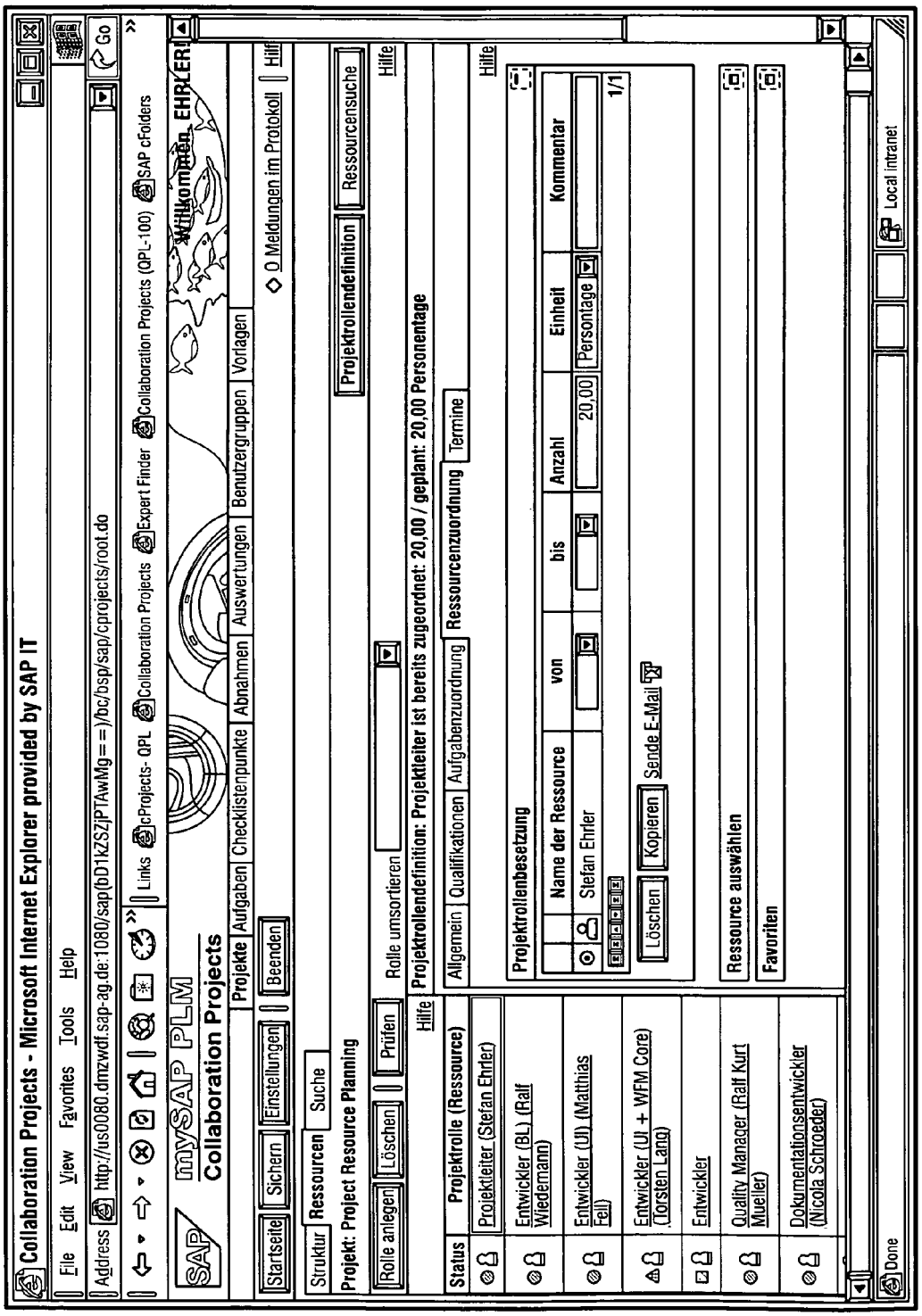

The assignment of an employee to a project role is marked with an attribute that distinguishes between soft booking, which is a tentative assignment and hard booking, which is a committed assignment. The distinction is indicated in a checkbox in the user interface, see FIG. 17. When not checked, the meeting is committed; when checked, the assignment is marked as tentative. These checkboxes are available in the resource allocation table and the assignment overview table. Individual meetings can likewise be marked as tentative or committed. The default setting is for committed assignments and meetings, but this can be changed in customizing or can be personalized by user parameters. When a project assignment itself is marked as tentative, meetings may still be marked as committed.

Utilization can be measured either by availability on the basis of committed bookings or by availability on the basis of both committed and tentative bookings. In this way, the project planner can assess the degree of utilization of the employee. The user can choose which method of utilization measurement he would like to see, or can look at both. The options are marked as radio buttons in the general search criteria menu of the resource search. Typically, only some of the tentative bookings become committed. This causes resources to be marked as utilized more than 100%.

The tentative and committed marks are shown in the groupware programs used by employees. The groupware integration software causes meetings that are marked as tentative to show up as, for example, free time in the Microsoft Outlook. Meetings that are marked as committed in the PRP software will show up as, for example, busy time periods in Microsoft Outlook. In WFM, the flags for the attributes "planned" and "booked" are set. The search result displays the percentage rate of availability relative to the requirements (the overhead required), and the percentage rate of utilization in the period. The rate of utilization has sub-columns that show total utilization (committed and tentative assignments and meetings), how much of that utilization is tentative, and how much is committed.

In the appointment calendar, the tentative and committed meetings are displayed with the same color as in the date navigator. Here, a corresponding tool tip for the cells also exists.

Figure 21:
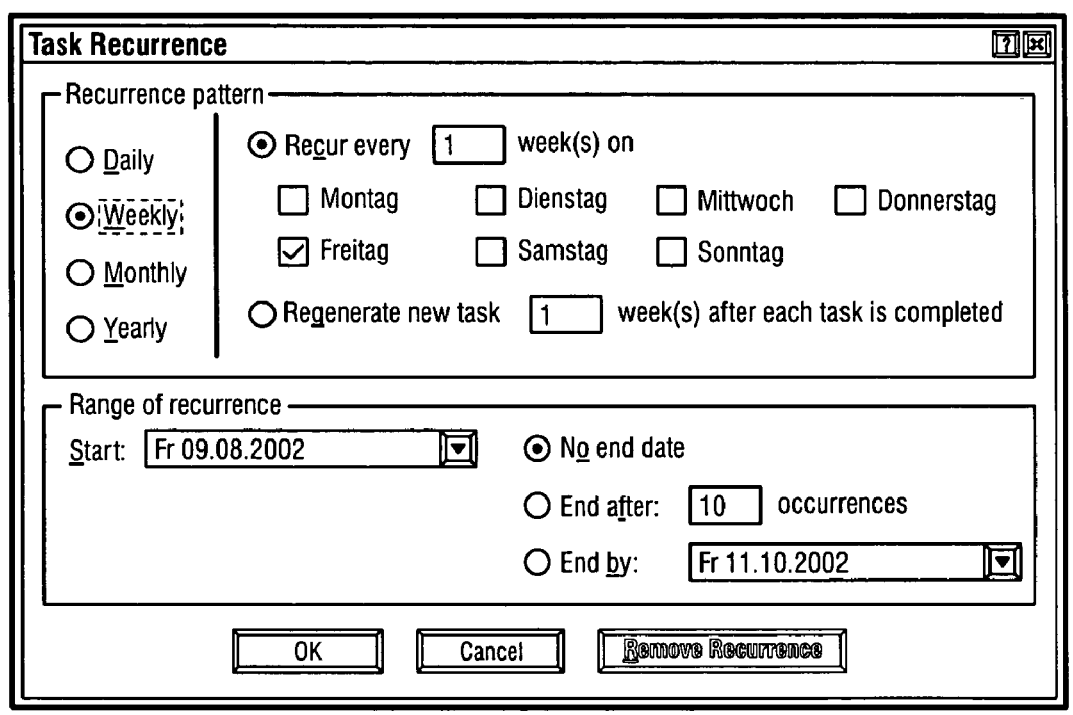

Periodic tasks can be set in the task recurrence window. These can be weekly (FIG. 21), monthly, or can have more complicated descriptions, as allowed in the window.

Figure 16:
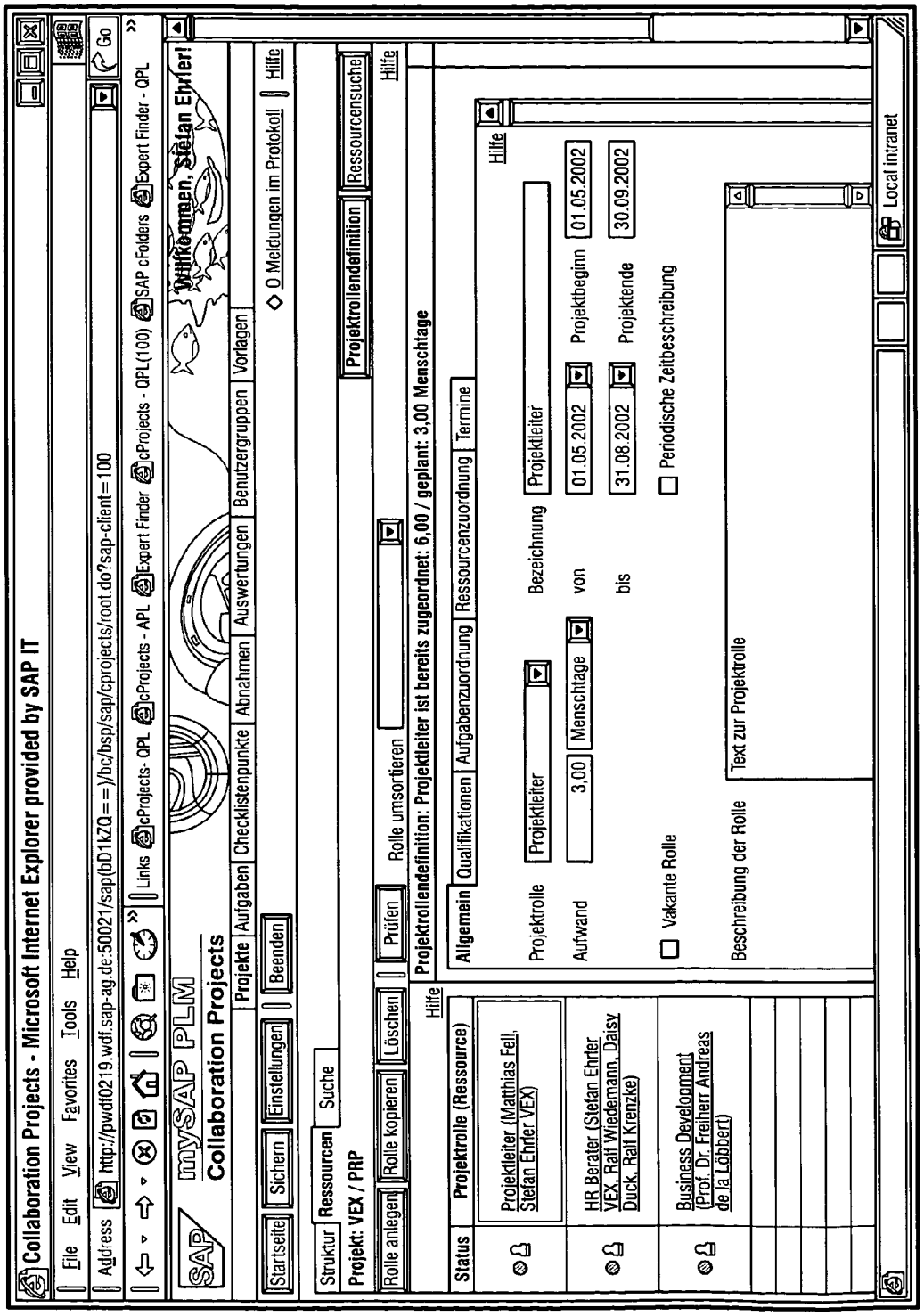
Figure 22:
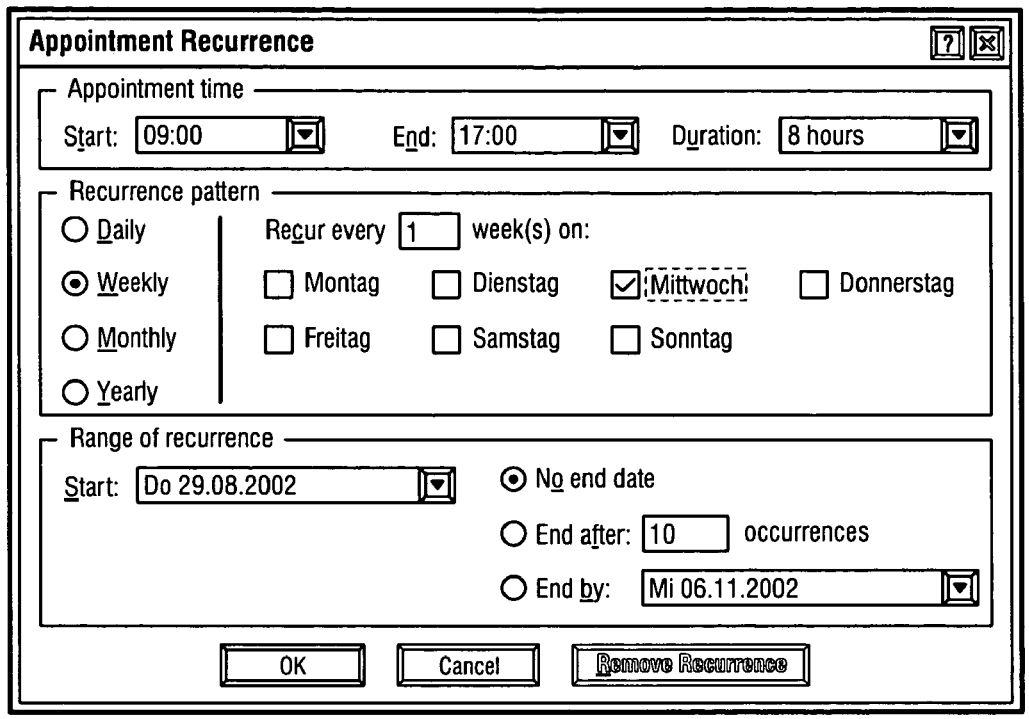
Figure 23:
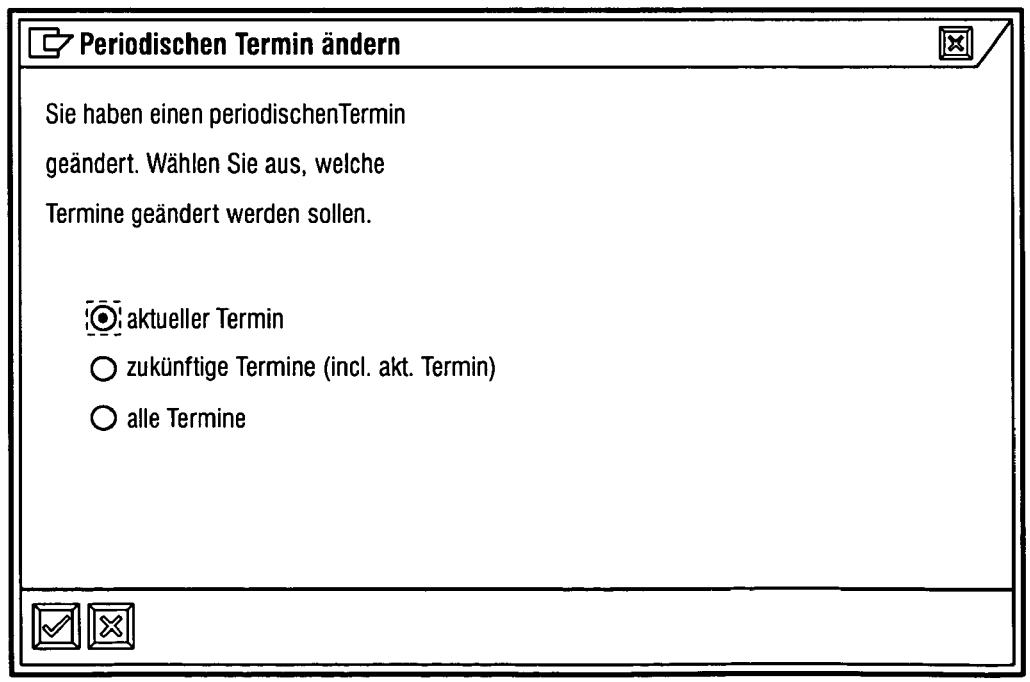

The project role definition can also include periodic time allotments, e.g. "the project leader is required only on Tuesdays, Wednesdays, and Thursdays, within the time from . . . to . . . , with the overhead of x days." This periodicity is formulated in the project role definition, and not in the allocation between project role and resource. The user interface for the definition of the project role has such a periodic time definition. See FIGS. 16 and 22.

The meetings assigned to an employee through his project role can also be set as periodic, e.g., "the consultant has a customer appointment only on Wednesdays from 09:00-17:00 hrs within the time from . . . to . . . ". The periodicities from the role are adopted as suggested in the appointments, but can be changed or redefined there. Appointments are depicted in WFM as refinement of capacitive assignments. These sub-assignments support periodic rules.

When changing or deleting periodic appointments, the user can decide whether to change only the current appointment, only future appointments, or all appointments in the series. The set periodicities from the project role are part of the search function and can be changed even there.

Figure 24:
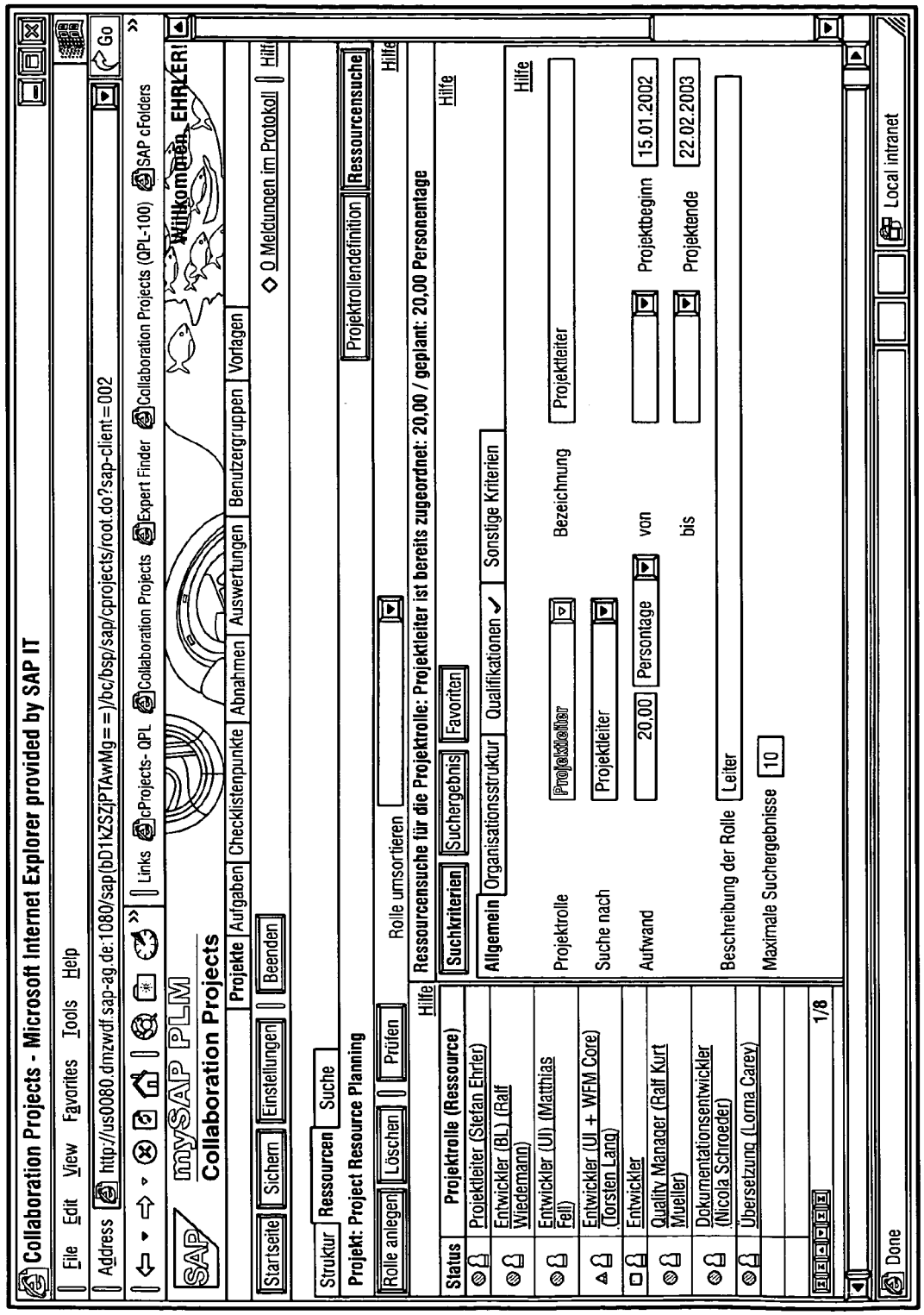
Figure 25:
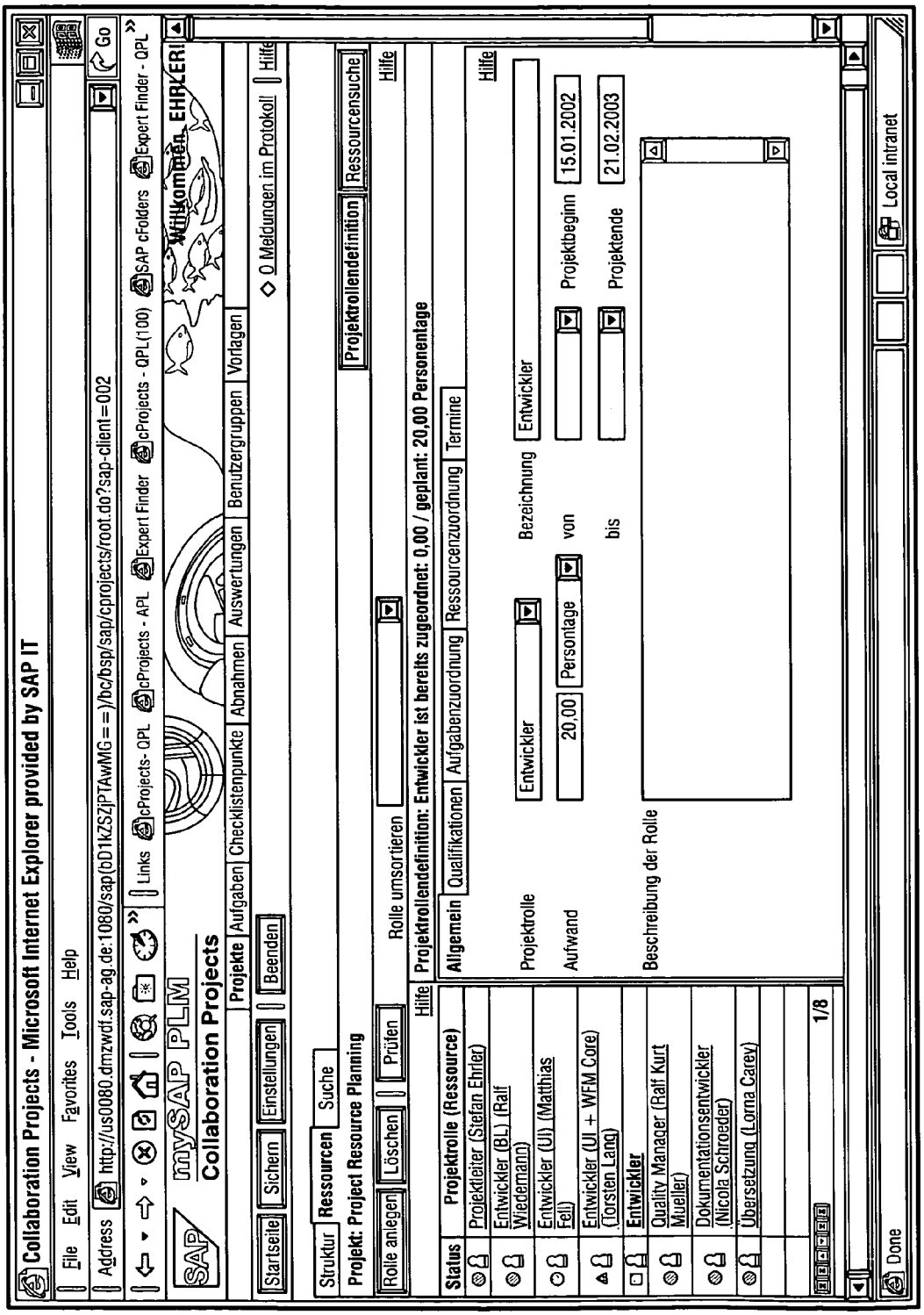
Figure 26:
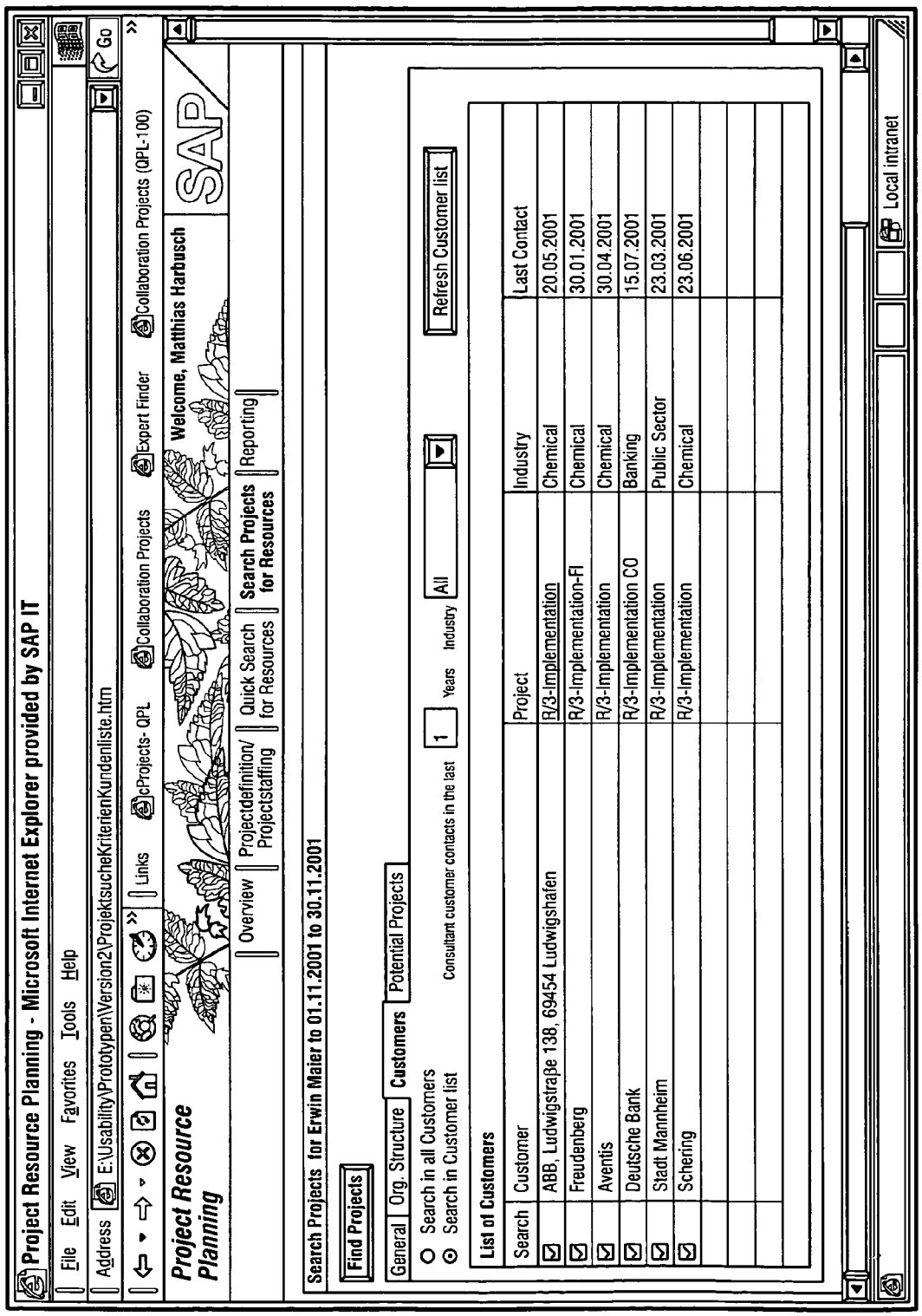
Figure 27:
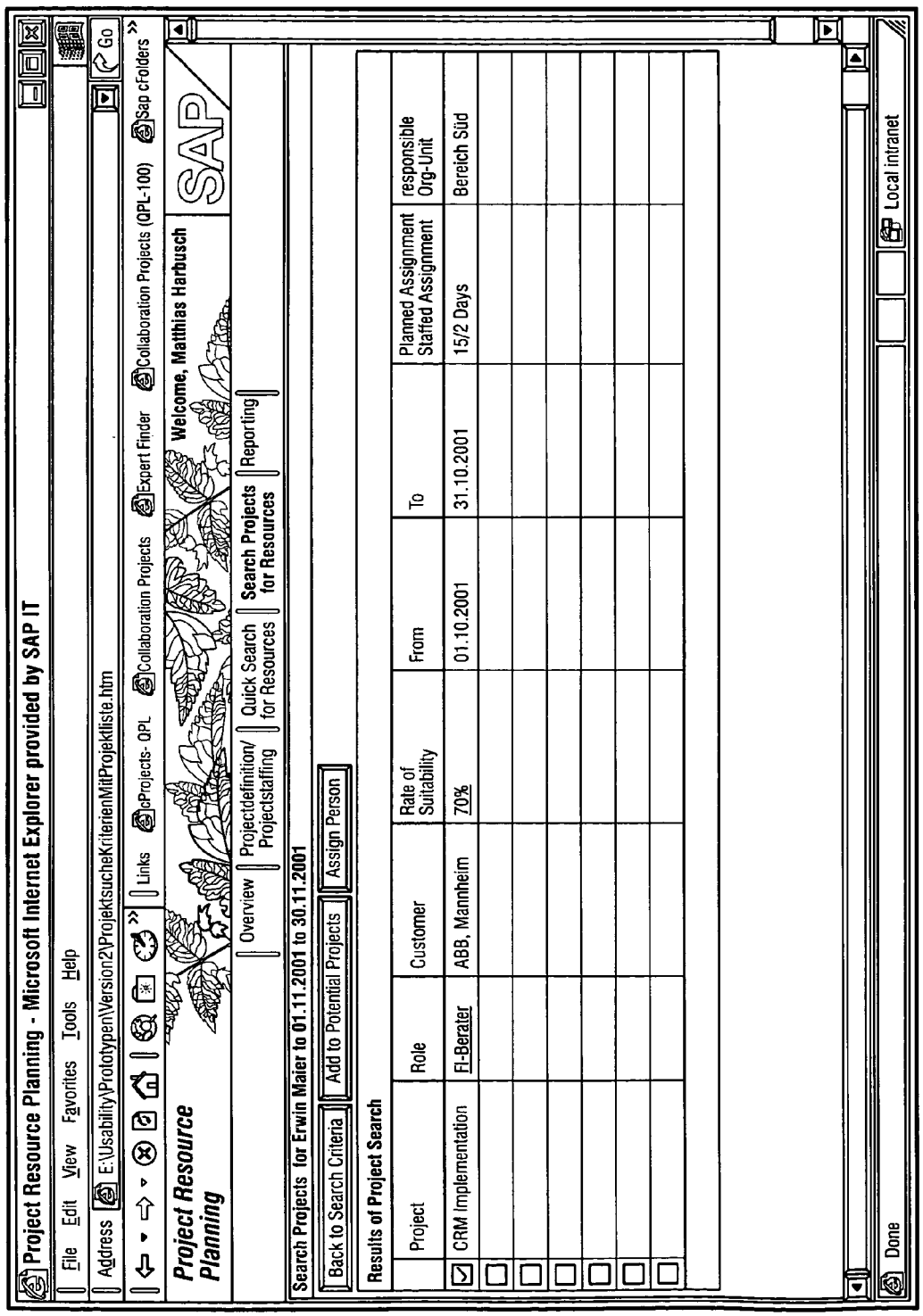

The direct resource search (without reference to a particular project) appears in the top-level menu, through which one navigates directly in the search screen (see FIG. 24). This search supports only a selection of search criteria and a match list. In the match list, making contact with the resources or the people responsible for the resource through e-mail is supported. A primary task for the consultant manager is to ensure good utilization of resources. Since projects or assignments are often postponed or rejected, it is necessary to search for suitable alternative/vacancies in other projects for the available (unutilized) resources.

There is an authorization check that enables the company to control who may search all projects for project role openings. One way this is accomplished is through naming certain employees resource managers. This title gives employees access to data concerning all projects. For this role, the relevant authorization can be specified in the project itself, e.g. "only display".

When assigning project roles, the project manager is given the option of marking the project role as a vacancy. Project vacancies (once marked) are placed in a market place (e.g., through portal 420), which can be viewed by available employees or the responsible consulting managers in order to allocate their resources to suitable projects. Appropriate authorization is required to post vacancies and can also be required for viewing. The project leader sets the project role to vacant, while the resource manager, who is responsible for the optimal utilization of his employees, has access to the information. The employee can inform himself directly about the vacancies in projects from the market place.

The function element should provide the following data: data on the project, project number, project name, responsible role and the responsible business partner (including e-mail), ordering party and customer, data on project role (e.g. project vacancy), name of the project role, time period, overhead, description of the project role, qualifications, and task assignments.

Available projects can be searched by reference to a specific employee (such as his name, qualifying attributes, or capacitive attributes), the time period of the project, overhead, the status of projects, project role, or by customer or the ordering party.

When searching project vacancies by qualifying attributes, the user can deactivate certain qualifying attributes for the search using a check box.

The result list of the search enables the planner to temporarily store some projects initially in the favorites.

Figure 28:
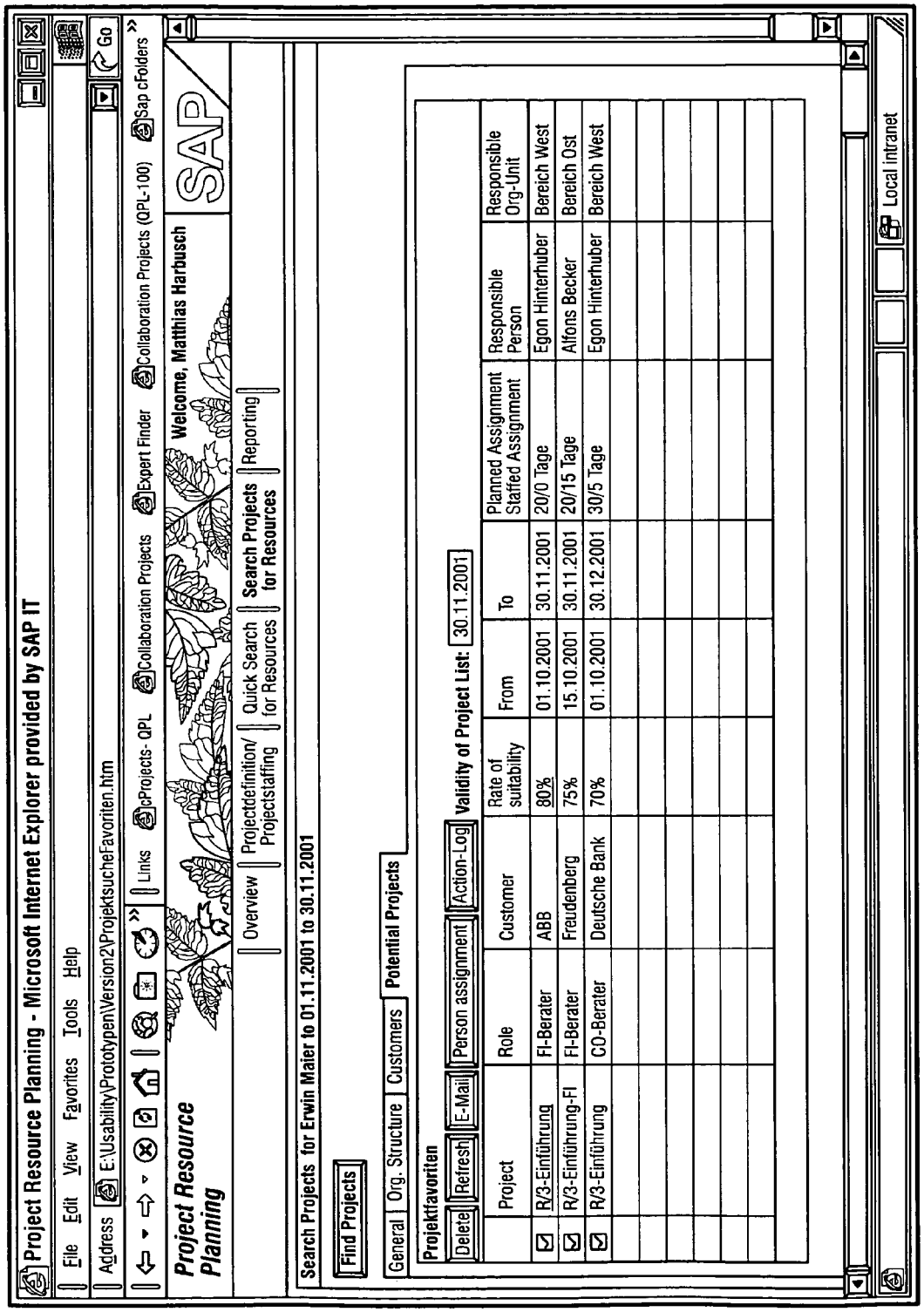

In the favorites list, the planner can order more detailed information on the project (through navigation), if he has authorization and/or the planner establishes contact with the relevant responsible person for the project. The list therefore contains the names of the responsible person for a project and support communication with the contacts (by e-mail or telephone). See FIG. 28.

A resource search may also use as search criteria the identity of the customer or ordering party. This option finds the resources which have been allocated in a previous project for this customer or ordering party. A match list generated by the resource search can be adapted for display. Using a dropdown list above the match list, different pre-set layouts can be selected. One layout could be for a manager with a free resource, another for resource suitability and availability. It is also possible for each user to customize his settings, for example, by choosing which columns to display. The number of lines in the match list can be set; thus on the same screen, the details of an employee can also be displayed. Each user's setting is then stored.

One of the standard settings for the search criteria used in the resource search can specify that initially, suitable and available resources should be searched from one's own organization unit. This applies as a standard setting only when the user has not entered any details in the organization structure for the search.

In one alternative, the user's organization unit is determined by analyzing the organizational allocation (user to business partner to plan positions to organization unit, or a new responsibility-relationship such as user to business partner to (" . . . is responsible for . . . ") to organization unit.

In another alternative, in the search criteria, the selected organization units are stored in relation to the user, and are used repeatedly as the presetting.

WFM relates in various ways to PRP. In the PRP software, an employee can be assigned to a project role by capacity, e.g., 3 workdays in the period from Jan. 11, 2002 to Aug. 8, 2002. This capacitive assignment is transferred in the PRP program to WFM to enable a complete utilization study to be made of the resource. The capacitive allocation must be taken into account in addition to the committed assignments to study availability or utilization. This allows the correct calculation of availability of the resource because committed assignments are not to be seen as adding to the capacitive allocations. Tentative and committed assignments are also recorded.

While evaluating the assignments in WFM with regard to the reduction of the availability of the resource, only the working hours of the resource are used as reduction quota in the assignment period, e.g., each day would have an input of 8 free hours, rather than 24.

Spot-consulting means planning small projects. Spot-consulting has no specified project structure. There is only one management task, e.g., the project itself. Also, there are no phases or tasks assigned to the project. There is an underlying customer order of some type and the overhead is small (e.g., 1 to 10 consulting days). Typically, there is only one project role for one employee or business partner.

For easy finding of free appointments for the resources, the date navigator uses a display of many colors, so that the user does not have to unnecessarily navigate through the calendar, but can directly detect free days, where he can set appointments. In WFM, different categories can exist for particular time specifications, e.g., vacation days, sicknesses, working hours etc. The categories from WFM are used in order to display this at least in the day view of the appointment calendar. Whole-day categories (e.g. leave, sickness etc.) are displayed in the week view as well.

Figure 30:
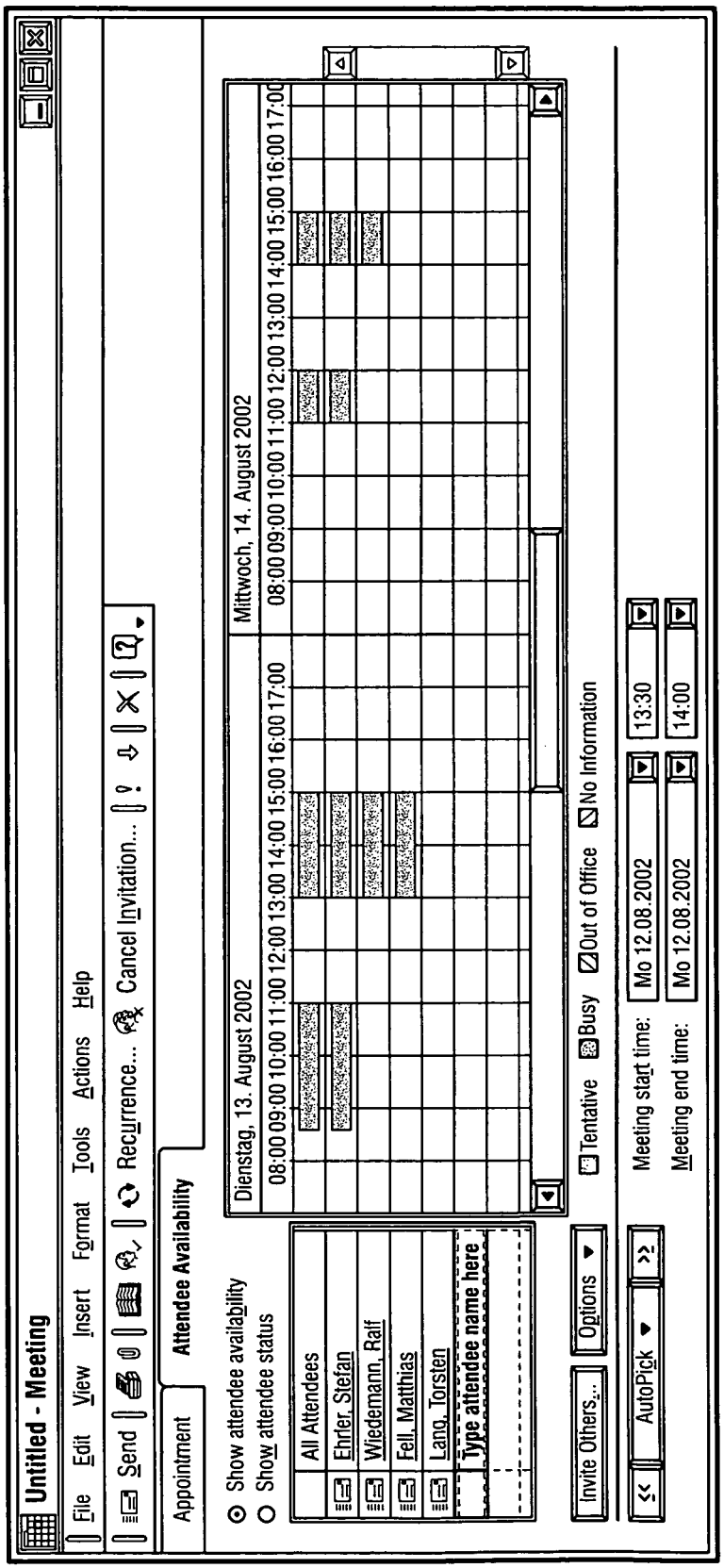

To find an appointment for a group of employees, an appointment search for a set of employees is required. For this, the free/busy analysis that is available in groupware programs is used. See FIG. 30. In order to find a common appointment for a group of employees, such an analysis is performed for all the members of the group. With the help of a relevant interface, it should be possible to find an available appointment for a set of persons and even fix an appointment directly. The availability data of individuals can be read from WFM as time intervals.

The financial calculations of a project can take place at an early stage including during the planning. The project may be roughly calculated to prepare an offer to a customer even when no person has been allocated yet. For fixed price projects, a budget is necessary which requires a calculation on the basis of the project role. In the area of professional service, the payment rates or settlement rates (internal/external) are applied for the project roles, in order to perform rough and simple calculations. These payment rates or settlement rates are plan proceeds. The program uses a settlement rate or payment rate (separated according to internal/external) for the project role types in customizing. By multiplying the planned overhead of all project roles with the settlement rate, a sum can then be determined very easily, which, e.g., can be used in an offer.

Certain project roles can be marked as not relevant for invoicing in the project structuring itself, since these roles may not be taken into consideration in the calculation of the project overhead. Examples include a decision maker, a project responsible person, etc.

Several appointments may be sent simultaneously for one resource. In the overview of appointments in the appointments tab, multiple sending is offered. Tasks and appointments can be sent for several selected persons simultaneously. For this, checkboxes are used, rather than single-select buttons.

The techniques described above can be implemented in software, hardware, firmware, or a combination of them using a wide variety of available platforms. FIG. 29 illustrates the conceptual relationship between concepts used in the PRP and related concepts of WFM and Groupware for two different possible implementations of the PRP.

Other implementations are also within the scope of the following claims.

The invention claimed is:

1. A method comprising:
searching, via one or more processors, a database stored on a computer-readable storage medium for information about resources that is used for participation in projects, the database containing time periods during which each of the resources is available, the time periods during which each of the resources is available indicating both tentative and non-tentative allocations of each of the resources, amounts of resource participation for which the resources can be used for the projects, and attributes for each resource,
wherein the projects require two or more resources to complete and the projects are comprised of a set of tasks, each individual task among the set of tasks requiring at least one qualifying attribute, selected from the attributes in the database, which qualifies each resource to perform a given task in the project, the at least one qualifying attribute including at least one skill, at least one qualification, at least one level of experience, or at least one level of expertise;
the searching comprising matching proposed amounts of resource participation, proposed time periods, and the at least one qualifying attribute of the resource with the available time periods, available amounts of resource participation, and available qualifying attributes stored in the database for each of the projects;
identifying, via the one or more processors, based on the at least one qualifying attribute necessary to complete each task of each project, available resources based on the matching;
determining, via the one or more processors, a priority value for each of the projects by identifying an importance for the project through receiving an identification of the importance of one of the qualifying attributes to the project from a user; and
allocating, via the one or more processors, resources to each project based on the identified resources necessary across all of the projects based on the available resources having the at least one qualifying attribute and the priority value of the project, wherein the allocation of resources includes both tentative and non-tentative allocation of resources.

2. The method of claim 1 in which the resources comprise people.

3. The method of claim 1 in which the time periods during which each of the resources is available comprise availability.

4. The method of claim 1 in which the amounts of participation for which the resources can be used comprise utilization.

5. The method of claim 1 also including a selection by a planner of resources to be used for the projects, the selection being made from among the resources allocated to the project during the allocating of resources.

6. The method of claim 5 also including communicating with resources about the selection using a groupware program.

7. A method comprising:
   searching, via one or more processors, a database stored on a computer-readable storage medium for specific human resources that is used for participation in projects, the database containing time periods during which each of the human resources is available, amounts of human resource participation for which the human resources can be used for the projects, the time periods during which each of the human resources is available indicating both tentative and non-tentative allocations of each of the human resources, and attributes for each resource,
   wherein the projects require two or more resources to complete and the projects are comprised of a set of tasks, each individual task among the set of tasks requiring at least one qualifying attribute, selected from the attributes in the database, which qualifies each resource to perform a given task in the project, the at least one qualifying attribute including at least one skill, at least one qualification, at least one level of experience, or at least one level of expertise;
   the searching comprising matching proposed amounts of human resource participation, proposed time periods, and the at least one qualifying attribute of the human resource with the available time periods, available amounts of human resource participation, and available qualifying attributes stored in the database for each of the projects;
   identifying, via the one or more processors, based on the at least one qualifying attribute necessary to complete each task of each project, available human resources based on the matching;
   determining, via the one or more processors, a priority value for each of the projects by providing priority categories that identify an importance of the projects and receiving a selection of one of the priority categories from a user, the priority categories including at least selection of at least one qualifying attribute for a project; and
   presenting, via the one or more processors, a proposed allocation of human resources to a project manager for the project based on the identified available human resources, the priority value of the project, and the degree to which the identified available human resources possess the at least one selected qualifying attribute, wherein the proposed allocation of human resources includes both tentative and non-tentative allocation of human resources.

8. The method of claim 7 in which the attributes comprise qualifying attributes that define qualifications of the human resources.

9. The method of claim 7 in which the attributes comprise capacitive attributes that define time constraints on suitable human resources.

10. The method of claim 9 in which the capacitive attributes include availability or utilization.

11. The method of claim 7 also including identifying, via the one or more processors, the importance of respective qualifying attributes.

12. The method of claim 11 in which the importance can be identified as mandatory or optional for qualification purposes.

13. An apparatus for identifying and optimizing human resources in for use in business projects comprising:
   a stored database containing information about human resources that is used for participation in projects, the database containing time periods during which each of the human resources is available, the time periods during which each of the resources is available indicating both tentative and non-tentative allocations of each of the resources, amounts of participation for which the resources can be used for the projects, and attributes for each resource;
   an application encoded on a non-transitory computer readable medium that enables a project manager to search the stored database, to match proposed amounts of participation, proposed time periods, and at least one qualifying attribute possessed by a resource and necessary for a project with the time periods stored in the database, amounts stored in the database, the attributes for each resource in the database, and to identify resources based on the matching, the at least one qualifying attribute including at least one of at least one skill, at least one qualification, at least one level of experience, and at least one level of expertise,
   wherein the application identifies, based on qualifying attributes necessary to complete each task of each project, available human resources based on the matching, and
   determines a priority value for each of the projects by identifying an importance for the project through receiving an identification of the importance of one of the qualifying attributes to the project from a user; and
   a user interface that provides a project manager with a proposed allocation of human resources for a project based on the identified available human resources, the priority value of the project, and the degree to which the identified available human resources possess the at least one selected qualifying attribute, wherein the proposed allocation of human resources includes both tentative and non-tentative allocation of human resources.

14. A computer readable storage medium comprising instructions which when executed by a processor in a computer cause the computer to execute a method for identifying and optimizing human resources for use in business projects, the method comprising:
   enabling a project manager to search a database for specific human resources that is used for participation in projects, the database containing time periods during which each of the human resources is available, the time periods during which each of the human resources is available indicating both tentative and non-tentative allocations of each of the human resources, amounts of human resource participation for which the human resources can be used for the projects, and attributes for each resource,
   wherein the projects require two or more resources to complete and the projects are comprised of a set of tasks, each individual task among the set of tasks requiring at least one qualifying attribute, selected from the attributes in the database, which qualifies each resource to perform a given task in the project, the at least one qualifying attribute including at least one skill, at least one qualification, at least one level of experience, or at least one level of expertise;

the searching comprising matching proposed amounts of human resource participation, proposed time periods, and the at least one qualifying attribute of the human resource with the available time periods, available amounts of human resource participation, and available qualifying attributes stored in the database for each of the projects;

identifying, based on the at least one qualifying attribute necessary to complete each task of each project, available human resources based on the matching;

determining a priority value for each of the projects by providing priority categories that identify an importance of the projects and receiving a selection of one of the priority categories from a user, the priority categories including at least selection of at least one qualifying attribute for a project; and presenting a proposed allocation of human resources to the project manager for a the project based on the identified available human resources, the priority value of the project, and the degree to which the identified available human resources possess the at least one selected qualifying attribute, wherein the proposed allocation of human resources includes both tentative and non-tentative allocation of human resources.

* * * * *